(12) United States Patent
Mochida

(10) Patent No.: US 7,631,559 B2
(45) Date of Patent: Dec. 15, 2009

(54) ACCELERATION SENSOR

(75) Inventor: Yoichi Mochida, Chigasaki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 504 days.

(21) Appl. No.: 11/575,799

(22) PCT Filed: Sep. 8, 2005

(86) PCT No.: PCT/JP2005/016542

§ 371 (c)(1),
(2), (4) Date: Mar. 22, 2007

(87) PCT Pub. No.: WO2006/112051

PCT Pub. Date: Oct. 26, 2006

(65) Prior Publication Data

US 2009/0183571 A1    Jul. 23, 2009

(30) Foreign Application Priority Data

Apr. 6, 2005    (WO) ............... PCT/JP2005/006783

(51) Int. Cl.
G01P 15/00 (2006.01)

(52) U.S. Cl. ............... 73/514.36; 73/509; 73/510; 73/514.38

(58) Field of Classification Search ........... 73/514.33, 73/514.36, 495, 509, 504.03, 504.12, 510, 73/514.06, 514.21, 514.23, 514.24, 514.38
See application file for complete search history.

(56) References Cited

U.S. PATENT DOCUMENTS 4,631,834 A * 12/1986 Hayashi et al. ............... 33/503
4,675,874 A *  6/1987 POhler et al. ............... 372/33
6,194,839 B1   2/2001 Chang (Continued)

FOREIGN PATENT DOCUMENTS

EP    1 349 434 A2    10/2003

(Continued)

OTHER PUBLICATIONS

Official Communication of PCT Application No. PCT/JP2005/016542; mailed on Dec. 13, 2005.

(Continued)

*Primary Examiner*—Hezron Williams
*Assistant Examiner*—Samir M Shah
(74) *Attorney, Agent, or Firm*—Keating and Bennett, LLP

(57) ABSTRACT

An acceleration sensor includes a base having an XY-substrate surface which is parallel to an XY plane, a beam portion having a frame shape which is arranged in a floating state above the XY-substrate surface of the base, a beam-supporting fixed portion which supports the beam on the base via supporting units like a beam supported by its both ends, weight portions 7 which are arranged so as to float above the XY-substrate surface of the base, and connecting portions which support the weight portions 7 to the beam portion in a cantilever manner. The weight portions are displaceable in the X-axis direction, the Y-axis direction, and the Z-axis direction by the bending deformation of the frame-shaped beam portion. The beam portion is provided with an X-axis direction acceleration detecting portion, a Y-axis direction acceleration detecting portion, and a Z-axis direction acceleration detecting portion.

25 Claims, 13 Drawing Sheets

U.S. PATENT DOCUMENTS

| | | |
|---|---|---|
| 6,201,353 B1 | 3/2001 | Chang et al. |
| 6,848,320 B2 * | 2/2005 | Miyajima et al. .............. 73/763 |
| 7,331,230 B2 * | 2/2008 | Takeyari et al. .......... 73/514.33 |
| 7,389,691 B2 * | 6/2008 | Kai .......................... 73/514.36 |
| 2004/0012062 A1 * | 1/2004 | Miyajima et al. ........... 257/419 |
| 2005/0279166 A1 * | 12/2005 | Shizuno ....................... 73/493 |
| 2006/0130577 A1 * | 6/2006 | Kai .......................... 73/504.14 |
| 2006/0173257 A1 * | 8/2006 | Nagai et al. ................. 600/323 |
| 2006/0217603 A1 * | 9/2006 | Nagai et al. ................. 600/323 |
| 2007/0089514 A1 * | 4/2007 | Takeyari et al. .......... 73/514.33 |

FOREIGN PATENT DOCUMENTS

| | | |
|---|---|---|
| JP | 04-050657 A | 2/1992 |
| JP | 06-082472 A | 3/1994 |
| JP | 06-130083 A | 5/1994 |
| JP | 08-160070 A | 6/1996 |
| JP | 09-054113 A | 2/1997 |
| JP | 09-196965 A | 7/1997 |
| JP | 2002-296293 A | 10/2002 |
| TW | 402098 B | 8/2000 |
| TW | 594015 B | 6/2004 |
| TW | 594016 B | 6/2004 |
| WO | 99/20085 A1 | 4/1999 |
| WO | 01/33911 A1 | 5/2001 |

OTHER PUBLICATIONS

Official Communication of PCT Application No. PCT/JP2005/006783; mailed on Jul. 19, 2005.

Official communication issued in counterpart European Application No. 06711761.4, mailed on Apr. 1, 2009.

Official communication issued in the counterpart Chinese Application No. 095110831, mailed on Mar. 29, 2006.

* cited by examiner

ACCELERATION SENSOR

BACKGROUND OF THE INVENTION

1. Field of the Invention

The present invention relates to an acceleration sensor which detects acceleration in three-axis directions of an X-axis direction and a Y-axis direction and a Z-axis direction, all of which are perpendicular to each other.

2. Description of the Related Art

FIG. 15A illustrates a schematic perspective view of one example of an acceleration sensor (see, for example, Japanese Unexamined Patent Application Publication No. 2002-296293 (Patent Document 1)). The acceleration sensor 40 includes a frame portion 41, a cylindrical weight member 42 which is arranged in the center portion of the frame portion 41, X-axis direction beam portions 43a and 43b, each of which has an elongated shape in the X-axis direction from both sides in the X-axis direction of the weight member 42 to the frame portion 41, Y-axis direction beam portions 44a and 44b, each of which has an elongated shape in the Y-axis direction from both sides in the Y-axis direction of the weight member 42 to the frame portion 41, four reinforcing weight members 45a through 45d serially connected to the weight member 42, resistors Rx1 through Rx4 and Rz1 through Rz4 which are arranged on the X-axis direction beam portions 43a and 43b, and resistors Ry1 through Ry4 which are arranged on the Y-axis direction beam portions 44a and 44b.

With the configuration of the acceleration sensor 40 illustrated in FIG. 15A, the central axis of the X-axis direction beam portions 43a and 43b are arranged on the same straight line extending along the X-axis direction passing through the central axis of the cylindrical weight member 42, and further, the central axis of the Y-axis direction beam portions 44a and 44b are arranged on the same straight line extending along the Y-axis direction passing through the central axis of the cylindrical weight member 42. These X-axis direction beam portions 43a and 43b and Y-axis direction beam portions 44a and 44b are configured so as to be capable of bending deformation.

The resistors Rx1 and Rx2 are arranged along the X-axis direction on the X-axis direction beam portion 43a, and the resistors Rx3 and Rx4 are arranged along the X-axis direction on the X-axis direction beam portion 43b. The resistors Ry1 and Ry2 are arranged along the Y-axis direction on the Y-axis direction beam portion 44a, and the resistors Ry3 and Ry4 are arranged along the Y-axis direction on the Y-axis direction beam portion 44b. Resistors Rz1 and Rz2 are arranged along the X-axis direction on the X-axis direction beam portion 43a, and resistors Rz3 and Rz4 are arranged along the X-axis direction on the X-axis direction beam portion 43b. These resistors Rx1 through Rx4, Ry1 through Ry4, and Rz1 through Rz4 each can have the electrical resistance value thereof changed by the stress change of the beam portions 43a, 43b, 44a, and 44b from the bending deformation of the beam portions 43a, 43b, 44a, and 44b.

Wiring is provided on each of the beam portions 43a, 43b, 44a, and 44b, and the frame portion 41 in order for the four resistors Rx1 through Rx4 to define a bridge circuit such as that shown in FIG. 15B, and in order for the four resistors Ry1 through Ry4 to define a bridge circuit such as that shown in FIG. 15C, and in order for the four resistors Rz1 through Rz4 to define a bridge circuit such as that shown in FIG. 1D. It should be noted that the reference symbol Vcc shown in FIGS. 15B through 15D shows a voltage power input portion which is connected to an external voltage power source, and the reference symbols Px1, Px2, Py1, Py2, Pz1, Pz2 each show a voltage detecting portion.

The weight member 42 and the reinforcing weight members 45a through 45d are each in a floating state, and are capable of being displaced by the bending deformation of the beam portions 43a, 43b, 44a, and 44b. For example, when the force in the X-axis direction originating from the acceleration in the X-axis direction acts against the weight member 42 and the reinforcing weight members 45a through 45d, the weight member 42 and the reinforcing weight members 45a through 45d swing and are displaced in the X-axis direction. Similarly, when the force in the Y-axis direction originating from the acceleration in the Y-axis direction acts against the weight member 42 and the reinforcing weight members 45a through 45d, the weight member 42 and the reinforcing weight members 45a through 45d swing and are displaced in the Y-axis direction. Further similarly, when the force in the Z-axis direction originating from the acceleration in the Z-axis direction acts against the weight member 42 and the reinforcing weight members 45a through 45d, the weight member 42 and the reinforcing weight members 45a through 45d swing and are displaced in the Z-axis direction. The beam portions 43a, 43b, 44a, and 44b are subjected to bending deformation by such displacement of the weight member 42 and the reinforcing weight members 45a through 45d.

With the acceleration sensor 40, the resistance value of the resistors Rx1 through Rx4, Ry1 through Ry4, and Rz1 through Rz4 varies by the stress generated by the beam portions 43a, 43b, 44a, and 44b from the bending deformation of the beam portions 43a, 43b, 44a, and 44b. From the change in resistance value of the resistors, the resistance value of the four resistors of each bridge circuit in FIGS. 15B through 15D becomes out of balance. For example, when acceleration is occurring in the X-axis direction, this results in differences in the voltage output by each of the voltage detecting portions Px1 and Px2 of the bridge circuit in FIG. 15B. Using this voltage difference, the amount of acceleration in the X-axis direction can be detected. Also, when acceleration is occurring in the Y-axis direction, this results in differences in the voltage output by each of the voltage detecting portions Py1 and Py2 of the bridge circuit in FIG. 15C. Using this voltage difference, the amount of acceleration in the Y-axis direction can be detected. Further, when acceleration is occurring in the Z-axis direction, this results in differences in the voltage output by each of the voltage detecting portions Pz1 and Pz2 of the bridge circuit in FIG. 15D. Using this voltage difference, the amount of acceleration in the Z-axis direction can be detected.

With the configuration of the acceleration sensor 40 illustrated in FIG. 15A, the beam portions 43a, 43b, 44a, and 44b which are linear are each arranged on four sides of the weight member 42, and link the weight member 42 to the frame portion 41. Thus, if distortion occurs to the frame portion 41 due to thermal stress, the distortion occurs to the beam portions 43a, 43b, 44a, and 44b corresponding to the distortion to the frame portion 41, compression stress or tension stress occurs to the beam portions 43a, 43b, 44a, and 44b. The resistors Rx1 through Rx4, Ry1 through Ry4, and Rz1 through Rz4 for detecting acceleration are provided on the beam portions 43a, 43b, 44a, and 44b, and therefore, regardless of acceleration not occurring, the electrical resistance values of the resistors Rx1 through Rx4, Ry1 through Ry4, and Rz1 through Rz4 change by the stresses generated on the beam portions 43a, 43b, 44a, and 44b, due to distortion caused by the thermal stress of the frame portion 41. Thus, regardless of acceleration not occurring, voltage can be output from the bridge circuits in FIGS. 15B through 15D when acceleration is generated.

With the configuration of the acceleration sensor 40 illustrated in FIG. 15A, the acceleration-detecting resistors Rx1 through Rx4, Ry1 through Ry4, and Rz1 through Rz4 are provided on the beam portions 43a, 43b, 44a, and 44b which are arranged on the four sides of the weight member 42, and the arrangement positions of the resistors are scattered. For example, in the event that the beam portions 43a, 43b, 44a, and 44b are configured with silicon, the resistors Rx1 through Rx4, Ry1 through Ry4, and Rz1 through Rz4 which are doped with phosphorus (P) or boron (B) and are piezoresistant are provided on the resistor arrangement positions on the beam portions 43a, 43b, 44a, and 44b. In this event, if the resistor arrangement positions are scattered, uniform doping with phosphorus or boron at the respective resistor arrangement positions is difficult, and the doping concentration varies at the respective resistor arrangement positions. Thus, balancing the resistance value of the four resistors on each bridge circuit illustrated in FIGS. 15B through 15D is difficult, and a problem occurs wherein improvements in the precision of detecting acceleration are prevented.

Other examples of known acceleration sensors are disclosed in Japanese Unexamined Patent Application Publication No. 8-160070 (Patent Document 2) and Japanese Unexamined Patent Application Publication No. 6-82472 (Patent Document 3).

SUMMARY OF THE INVENTION

To overcome the problems described above, preferred embodiments of the present invention provide a base having an XY-substrate surface which is parallel or substantially parallel to an XY flat surface including an X-axis and a Y-axis of the X-axis and Y-axis and Z-axis, all of which are perpendicular to one another, a beam portion having a frame shape which is arranged in a floating state above the XY-substrate surface of the base a beam supporting fixed portion which supports the beam portion on the base, such as a beam supported at both ends thereof, via supporting portions having an elongated shape on both sides of the beam portion, each facing outwards along the X-axis direction, a connecting portion having an elongated shape facing outwards along the Y-axis direction from each of both sides of the Y-axis direction of the beam portion in a state of floating above the XY-substrate surface of the base, and a weight portion which is connected to each of the elongated end portions of each connection portion.

The weight portion is configured to be capable of displacement in the three-axis directions of the X-axis direction and the Y-axis direction and the Z-axis direction by the deformation of the frame-shaped beam portion, and the beam portion includes an X-axis direction acceleration detecting portion arranged to detect acceleration in the X-axis direction based on the bending deformation of the beam portion originating in the X-axis direction displacement of the weight portion, a Y-axis direction acceleration detecting portion arranged to detect acceleration in the Y-axis direction based on the bending deformation of the beam portion originating in the Y-axis direction displacement of the weight portion, and a Z-axis direction acceleration detecting portion arranged to detect acceleration in the Z-axis direction based on the bending deformation of the beam portion originating in the Z-axis direction displacement of the weight portion.

According to a preferred embodiment of the present invention, the frame-shaped beam portions are arranged to be supported by a base, such as a beam supported at both ends thereof, via supporting portions having an elongated shape on both sides of the beam portion, each facing outwards along the X-axis direction. Therefore, when distortion occurs to the base due to thermal stress, the distortion in the Y-axis direction (for example, the lengthwise direction) is absorbed by the bending deformation of the supporting portion, and absolute displacement from distortion of the X-axis direction (for example, widthwise) distortion is small, and additionally the beam portion area which is separated from the beam portion area linked to the supporting portion or the connecting portion is deformed according to the X-axis direction distortion, and thus, the distortion is absorbed. Therefore, distortion is prevented from occurring in the linking portions to the supporting portion of the beam portion as well as the adjacent areas thereof, and the linking portions to the connecting portion and the adjacent areas thereof. For example, in a beam portion area where no distortion originating from the distortion to the base occurs when there is distortion to the base by thermal stress, by providing an X-axis direction acceleration detecting portion, a Y-axis direction acceleration detecting portion, and a Z-axis direction acceleration detecting portion thereupon to detect acceleration based on the distortion of the beam portion, false detection of acceleration (the event of false detection where acceleration is detected in the X-axis direction acceleration portion or the Y-axis direction acceleration portion or the Z-axis direction acceleration portion originating from the distortion from the thermal stress of the base, regardless of acceleration not occurring) originating from the distortion from the thermal stress of the base is prevented.

Also, preferred embodiments of the present invention have a simple configuration in that the frame-shaped beam portions are supported by a base, such as a beam supported at both ends thereof, and the weight portion is supported in a cantilever shape to the beam portion. Thus, size of the acceleration sensor is reduced.

Furthermore, with preferred embodiments of the present invention, the weight portion links to the frame-shaped beam portion in a cantilever shape. Therefore, displacement of the weight portion due to acceleration is greater, and thus, bending deformation of the beam portion originating from the displacement of the weight portion is greater, and sensitivity of acceleration detection is improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments relating to the present invention will be described below with reference to the drawings.

Figure 1A:
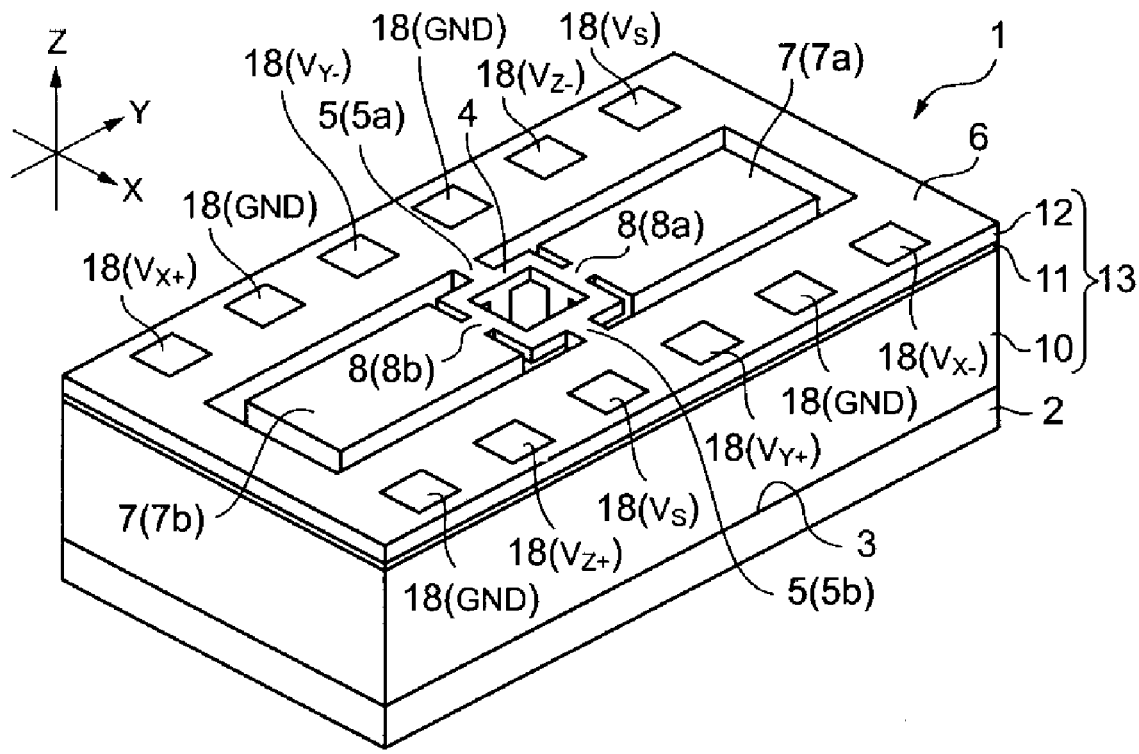
FIG. 1A is a perspective view schematically illustrating a first preferred embodiment of an acceleration sensor according to the present invention.
Figure 1B:
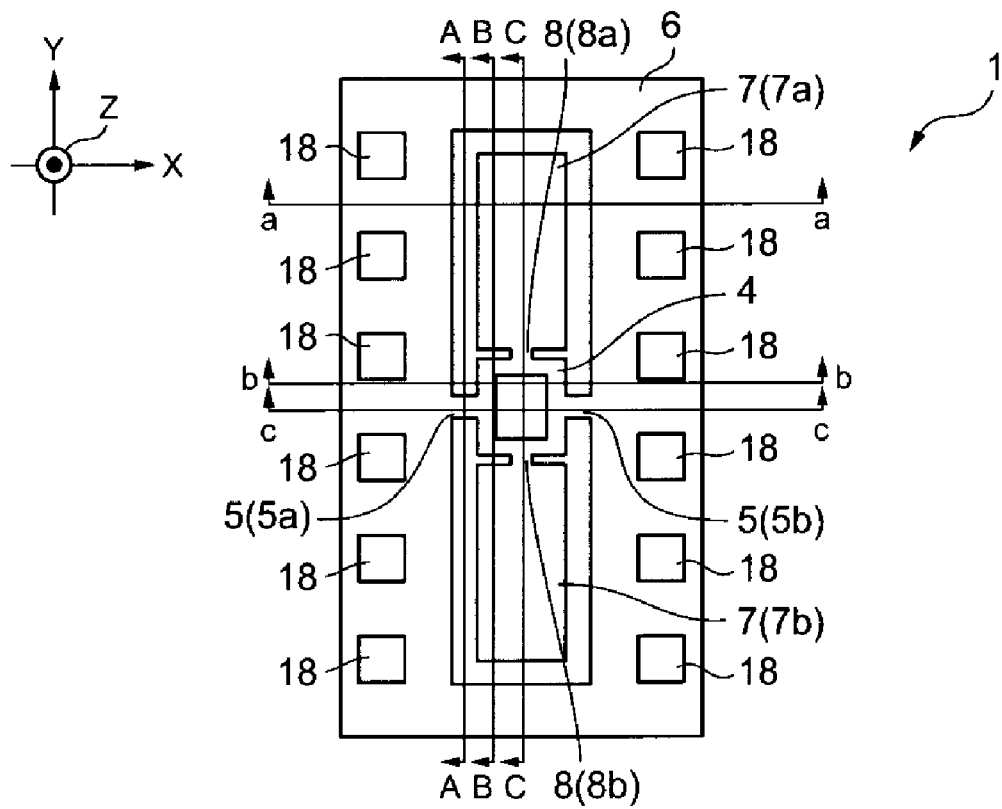
FIG. 1B is a schematic plan view illustrating the acceleration sensor in FIG. 1A.
Figure 2A:
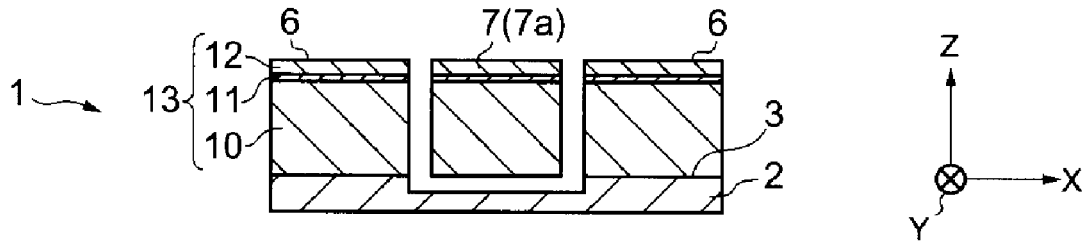
FIG. 2A is a schematic cross-sectional view of the portion taken along line a-a in FIG. 1B.
Figure 2B:
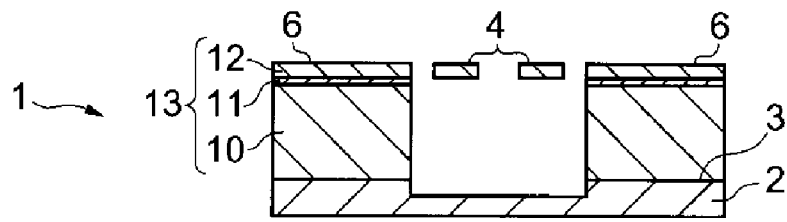
FIG. 2B is a schematic cross-sectional view of the portion taken along line b-b in FIG. 1B.
Figure 2C:
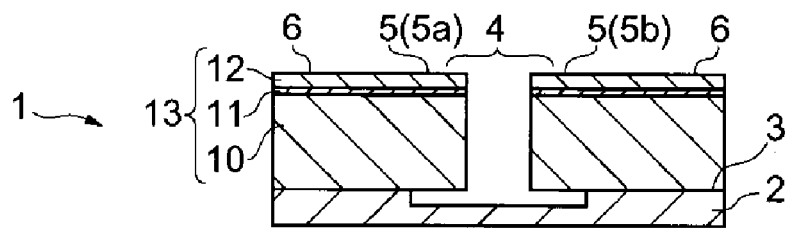
FIG. 2C is a schematic cross-sectional view of the portion taken along line c-c in FIG. 1B.
Figure 3A:
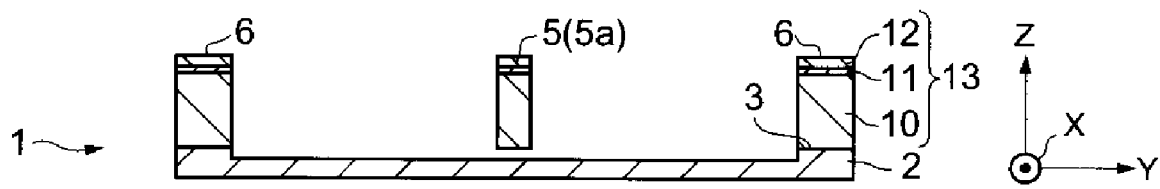
FIG. 3A is a schematic cross-sectional view of the portion taken along line A-A in FIG. 1B.
Figure 3B:
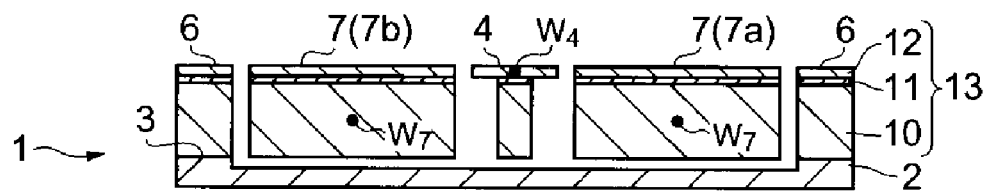
FIG. 3B is a schematic cross-sectional view of the portion taken along line B-B in FIG. 1B.
Figure 3C:
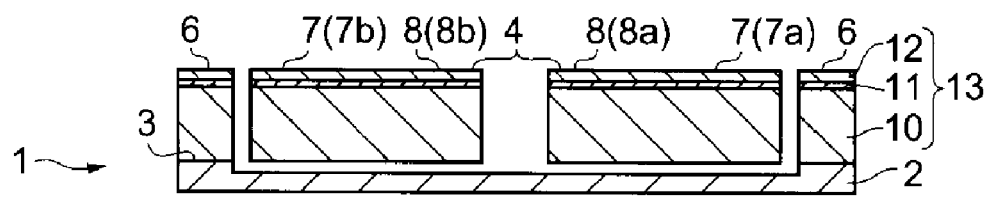
FIG. 3C is a schematic cross-sectional view of the portion taken along line C-C in FIG. 1B.

FIG. 1A is a perspective view schematically illustrating a first preferred embodiment of an acceleration sensor according to the present invention, and FIG. 1B is a schematic plan view illustrating the acceleration sensor in FIG. 1A. Also, FIG. 2A is a schematic cross-sectional view of the portion taken along line a-a in FIG. 1B, FIG. 2B is a schematic cross-sectional view of the portion taken along line b-b in FIG. 1B, and FIG. 2C is a schematic cross-sectional view of the portion taken along line c-c in FIG. 1B. Further, FIG. 3A is a schematic cross-sectional view of the portion taken along line A-A in FIG. 1B, FIG. 3B is a schematic cross-sectional view of the portion taken along line B-B in FIG. 1B, and FIG. 3C is a schematic cross-sectional view of the portion taken along line C-C in FIG. 1B.

An acceleration sensor 1 according to a first preferred embodiment detects acceleration in the three-axis directions of the X-axis and Y-axis and Z-axis, all of which are perpendicular to one another. The acceleration sensor 1 includes a base 2. The base 2 has an XY substrate surface 3 which is substantially parallel to an XY plane which includes the X-axis and the Y-axis, and a frame-shaped beam portion 4 is arranged in a floating state on the upper side of the XY substrate surface 3. The frame-shaped beam portion 4 preferably has a substantially square shape, and supporting portions 5 (5a and 5b) each have an elongated shape and are arranged on both sides of the beam portion 4 in the X-axis direction, each facing outwards along the X-axis direction.

The supporting portions 5a and 5b are each in a floating state with respect to the base 2, and the elongated end portions of the supporting portions 5a and 5b are connected to a fixed portion 6. The fixed portion 6 has a frame shape which surrounds an area defining the beam portion 4 and weight portions 7 (7a and 7b) to be described later, via a gap, and the fixed portion 6 is fixed to the base 2. In other words, the beam portion 4 is supported by and fixed to the base 2 via the supporting portions 5a and 5b, such as a beam supported at both ends thereof. That is to say, in the first preferred embodiment, a beam portion supporting fixed portion is provided by the supporting portion 5 (5a and 5b) and the fixed portion 6.

The weight portions 7a and 7b are arranged in the Y-axis direction with the beam portion 4 disposed therebetween, and are arranged in a floating state on the upper side of the XY substrate surface 3 of the base 2. The weight portions 7a and 7b are connected to the beam portion 4 by the connecting portion 8 (8a and 8b) which have an elongated shape on both sides of the beam portion 4 in the Y-axis direction, each facing outwards along the Y-axis direction. The connecting portions 8 (8a and 8b) are in a floating state with respect to the base 2, and the weight portions 7a and 7b are configured so as to be capable of displacement in the three-axis directions of the X-axis direction and the Y-axis direction and the Z-axis direction, from the bending deformation of the beam portion 4.

In the first preferred embodiment, the central axes along the X-axis direction of each supporting portion 5a and 5b are arranged on a common straight line, and the central axes along the Y-axis direction of each supporting portion 8a and 8b are arranged on a common straight line. The beam portion 4 preferably has a substantially square shape, and the beam portion 4 is symmetrical to the central axes which pass through the central axes in the X-axis direction of the supporting portions 5a and 5b, and also is symmetrical to the central axes which pass through the central axes in the Y-axis direction of the supporting portions 8a and 8b.

Figure 4:
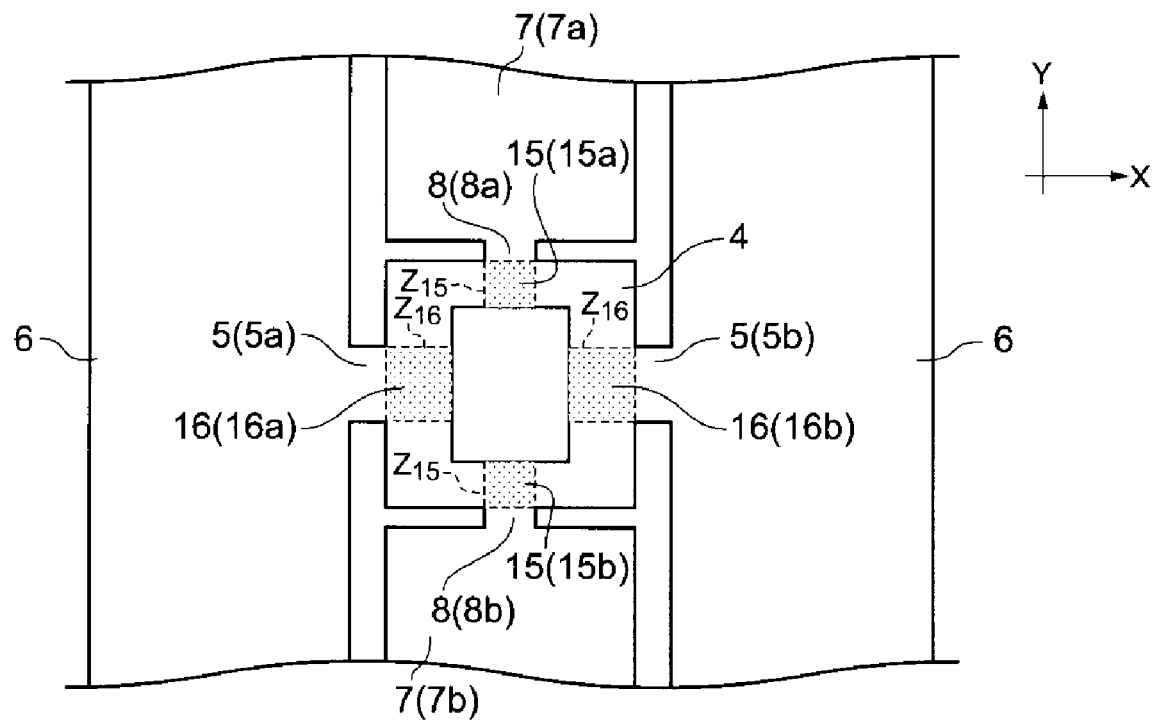
FIG. 4 is a diagram describing a configuration example relating to the thickness of a beam portion in the acceleration sensor in the first preferred embodiment of the present invention.

Also, in the first preferred embodiment, the thickness in the Z-axis direction of the band-shape beam portion on the connecting portion side 15 (15a and 15b) (see the area surrounded with a dotted line Z15 in FIG. 4) which is elongated in the Y-axis direction from each connecting portion 8a and 8b along the width of the connecting portions 8 toward the area of the beam portion 4 is approximately the same thickness as the thickness in the Z-axis direction of the connecting portions 8. Also, the thickness in the Z-axis direction of the band-shape beam portions on the supporting portion side 16 (16a and 16b) (see the area surrounded with a dotted line Z16 in FIG. 4) which is elongated in the X-axis direction from each supporting portion 5a and 5b along the width of the supporting portions 5 toward the area of the beam portion 4 is the approximately the same thickness as the thickness in the Z-axis direction of the supporting portions 5. In the first preferred embodiment, the thickness in the Z-axis direction of the band-shape beam portions on the connecting portion side 15 (15a and 15b) and the band-shape beam portions on the supporting portion side 16 (16a and 16b) in the beam portion 4 are, for example, approximately 400 μm, but the thickness in the Z-axis direction in the other portions of the beam portion 4 is thinner than the thickness of, for example, approximately 5 to 10 μm, in the Z-axis direction of the Z-axis direction of the band-shape beam portions on the connecting portion side 15 (15a and 15b) and the band-shape beam portions on the supporting portion side 16 (16a and 16b) in the beam portion 4.

In the first preferred embodiment, the thickness of the weight portions 7 in the Z-axis direction is, for example, approximately 400 μm, approximately the same thickness as the thickness of the supporting portions 5 or the connecting portions 8 in the Z-axis direction. Also, the center-of-gravity of the weight portions 7 (7a and 7b) is the position of the point W7 shown in FIG. 3B, for example, and the fulcrum of the beam portion 4 which supports the weight portion 7s (7a and 7b) is the position of the point W4 shown in FIG. 3B, for example, and the height position (position in the Z-axis direction) of the center-of-gravity position of the weight portions 7 and the fulcrum position of the beam portion 4 which supports the weight portions 7 (7a and 7b) is shifted from one another.

In the first preferred embodiment, the above-mentioned beam portion 4, supporting portions 5 (5a and 5b), fixed portion 6, weight portion 7 (7a and 7b), and connecting portions 8 (8a and 8b) are processed and formed using micromachining technology of an SOI (Silicon-On-Insulator) substrate (that is to say, a multi-layer substrate including an Si-layer 10 and an SiO$_2$-layer 11 and an Si-layer 12 layered in that order) 13.

In the preferred first embodiment, the following portions on the beam portion 4 which are configured with Si are processed, and a piezoresistant portion is provided for detecting acceleration. In other words, as illustrated in the enlarged schematic diagram in FIG. 5, piezoresistant portions $R_{x1}$ and $R_{x2}$ are arranged on both sides of the band of the band-shaped beam portion on the connecting portion side 15a in the beam portion 4, and piezoresistant portions $R_{x3}$ and $R_{x4}$ are arranged on both sides of the band of the band-shaped beam portion on the connecting portion side 15b. The four piezoresistant portions $R_{x1}$, $R_{x2}$, $R_{x3}$, and $R_{x4}$ define the X-axis direction acceleration detecting portion for detecting acceleration in the X-axis direction. A wiring pattern is provided on the beam portion 4 or the supporting portions 5 (5a and 5b) or the fixed portion 6 to define a bridge circuit as shown in FIG. 6A with the piezoresistant portions $R_{x1}$, $R_{x2}$, $R_{x3}$, and $R_{x4}$.

Figure 7:
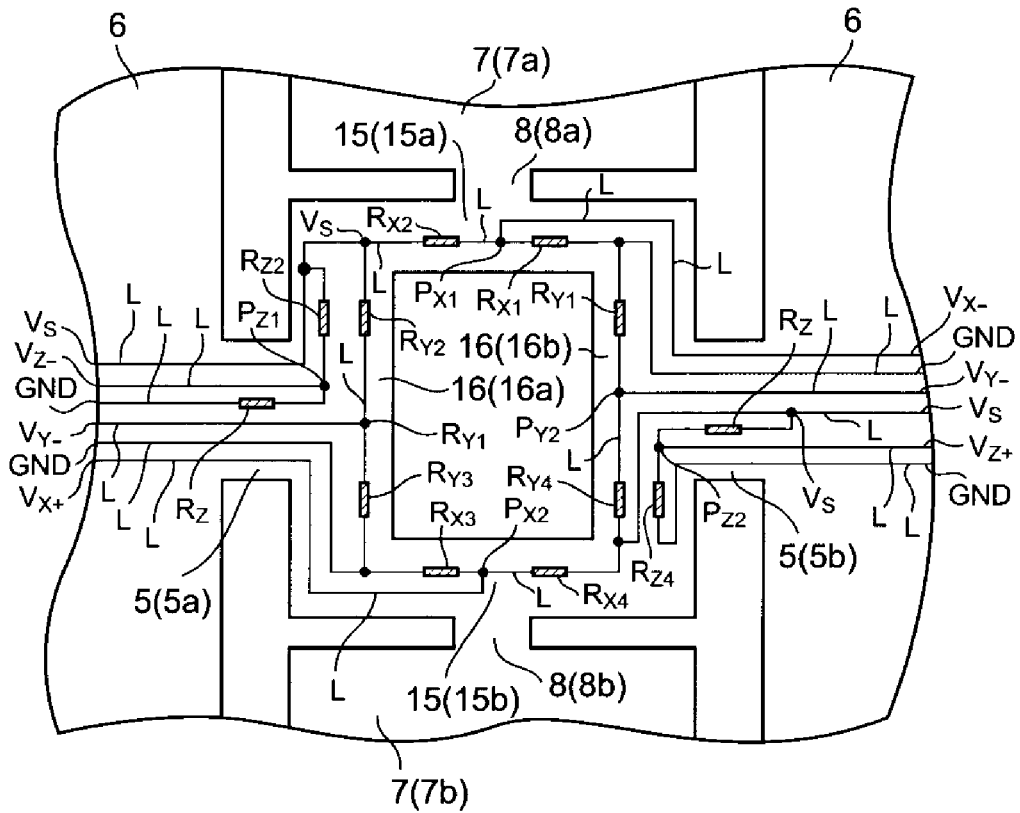
FIG. 7 is a schematic diagram for describing an example of an arrangement of a wiring pattern which connects the multiple piezoresistant portions provided on the beam portion, and define the bridge circuits shown in FIGS. 6A to 6B.

For example, FIG. 7 schematically shows one wiring example of the wiring pattern thereof. In this example, with the wiring pattern L, one end of each of the piezoresistant portions $R_{x1}$ and $R_{x2}$, which are arranged on both sides of the band of the band-shaped beam portion on the connecting portion side 15a, are electrically connected to each other and the voltage detecting portion $P_{x1}$ is provided. On the surface of the fixed portion 6, multiple electrode pads 18 are provided for external connections, as shown in FIG. 1A, and the voltage detecting portion $P_{x1}$ is electrically connected to the electrode pads 18 for external connection, which correspond individually to the voltage detecting portion $P_{x1}$, by the wiring pattern L. Similarly, one end of each of the piezoresistant portions $R_{x3}$ and Rx4, which are arranged on both sides of the band of the band-shaped beam portion on the connecting portion side 15b, are electrically connected to each other and the voltage detecting portion $P_{x2}$ is provided. The voltage detecting portion $P_{x2}$ is electrically connected to the electrode pads 18 for external connection, which correspond individually to the voltage detecting portion $P_{x2}$, by the wiring pattern L. Also, the other end of the piezoresistant portions $R_{x2}$ and $R_{x4}$ are each electrically connected to the electrode pads 18 for external connection in order to connect to an external voltage source Vs, with the wiring pattern L. Also, the other end of the piezoresistant portions $R_{x1}$ and $R_{x3}$ are each electrically connected to the electrode pads 18 for external connection in order to connect to the external ground GND, with the wiring pattern L.

Figure 6A:
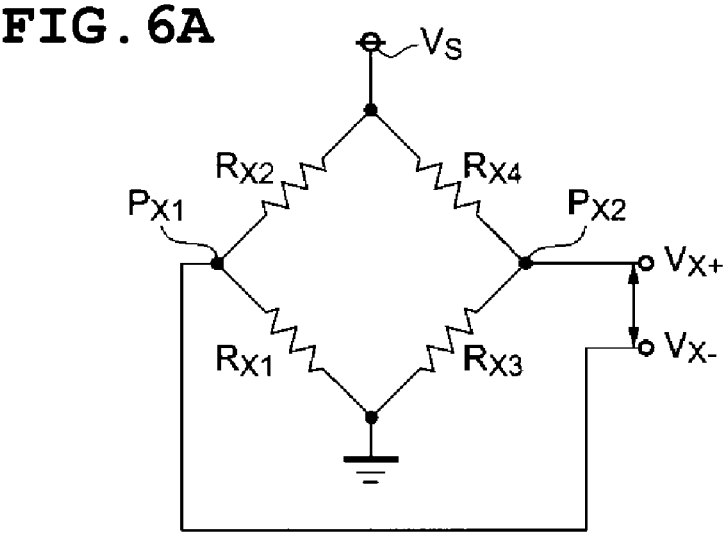
FIG. 6A is a circuit diagram for describing a bridge circuit which defines an X-axis direction acceleration detecting portion of the acceleration sensor in the first preferred embodiment of the present invention.
Figure 6B:
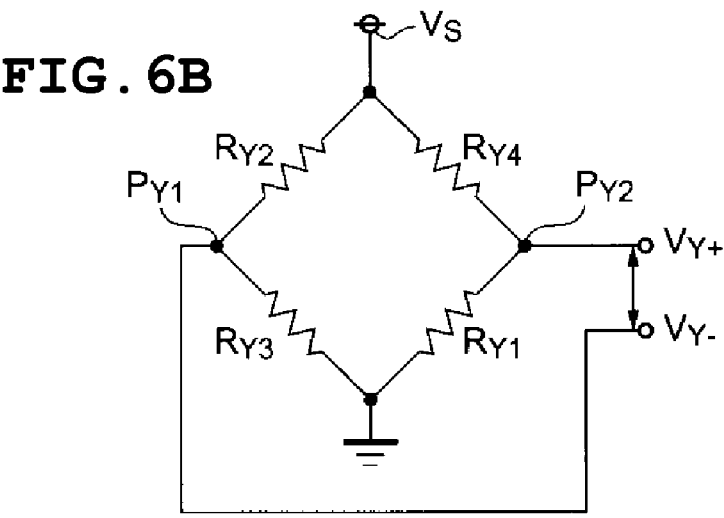
FIG. 6B is a circuit diagram for describing a bridge circuit which defines a Y-axis direction acceleration detecting portion of the acceleration sensor in the first preferred embodiment of the present invention.

In addition, with the beam portion 4, piezoresistant portions $R_{Y2}$ and $R_{Y3}$ are arranged on both sides of the band of the band-shaped beam portion on the supporting portion side 16a, and piezoresistant portions $R_{Y1}$ and $R_{Y4}$ are arranged on both sides of the band of the band-shaped beam portion on the supporting portion side 16b. The four piezoresistant portions $R_{Y1}$, $R_{Y2}$, $R_{Y3}$, and $R_{Y4}$ define the Y-axis direction acceleration detecting portion for detecting acceleration in the Y-axis direction. A wiring pattern is provided on the beam portion 4 or the supporting portions 5 (5a and 5b) or the fixed portion 6 to define a bridge circuit as shown in FIG. 6B with the piezoresistant portions $R_{Y1}$, $R_{Y2}$, $R_{Y3}$, and $R_{Y4}$.

In the wiring example shown in FIG. 7, with the wiring pattern L, one end of each of the piezoresistant portions $R_{Y2}$ and $R_{Y3}$, which are arranged on both sides of the band of the band-shaped beam portion on the supporting portion side 16a are electrically connected with each other and the voltage detecting portion $P_{Y1}$ is provided. The voltage detecting portion $P_{Y1}$ is electrically connected to the electrode pads 18 for external connection, which correspond individually to the voltage detecting portion $P_{Y1}$, by the wiring pattern L. Similarly, one end of each of the piezoresistant portions $R_{Y1}$ and $R_{Y4}$, which are arranged on both sides of the band of the band-shaped beam portion on the supporting portion side 16b, are electrically connected to each other and the voltage detecting portion $P_{Y2}$ is provided. The voltage detecting portion $P_{Y2}$ is electrically connected to the electrode pads 18 for external connection, which correspond individually to the voltage detecting portion $P_{Y2}$, by the wiring pattern L. Also, the other end of the piezoresistant portions $R_{Y2}$ and $R_{Y4}$ are each electrically connected to the electrode pads 18 for external connection in order to connect to an external voltage source Vs, with the wiring pattern L. Also, the other end of the piezoresistant portions $R_{Y1}$ and $R_{Y3}$ are each electrically connected to the electrode pads 18 for external connection in order to connect to the external ground GND, with the wiring pattern L.

Further, piezoresistant portions $R_Z$ are provided on each central axis of the supporting portions 5a and 5b in the X-axis direction, and a piezoresistant portion $R_{Z2}$ is provided on one side (the upper side in the example in FIG. 5) of the band-shaped beam portion on the supporting portion side 16a in the beam bottom portion 4, and a piezoresistant portion $R_{Z4}$ is provided on one side (the lower side in the example in FIG. 5) of the band-shaped beam portion on the supporting portion side 16b. These four piezoresistant portions $R_Z$, $R_Z$, $R_{Z2}$, and $R_{Z4}$ define the Z-axis direction acceleration detecting portion for detecting acceleration in the Z-axis direction. A wiring pattern is provided on the beam portion 4 or the supporting portion 5 (5a and 5b) or the fixed portion 6 to define a bridge circuit as shown in FIG. 6C with the piezoresistant portions $R_Z$, $R_Z$, $R_{Z2}$, and $R_{Z4}$.

For example, according to the wiring example in the wiring pattern shown in FIG. 7, with the wiring pattern L, one end of each of the piezoresistant portion $R_Z$ of the supporting portion 5a and the piezoresistant portion $R_{Z2}$ of a single edge of the band-shape beam portion on the supporting beam side 16a are electrically connected with each other and the voltage detecting portion $P_{Z1}$ is provided. The voltage detecting portion $P_{Z1}$ is electrically connected to the electrode pads 18 for external connection, which correspond individually to the voltage detecting portion $P_{Z1}$ by the wiring pattern L. Similarly, one end of each of the piezoresistant portion $R_Z$ of the supporting portion 5b and the piezoresistant portion $R_{Z4}$ of a single edge of the band-shape beam portion on the supporting beam side 16b are electrically connected with each other and the voltage detecting portion $P_{Z2}$ is provided. The voltage detecting portion $P_{Z2}$ is electrically connected to the electrode pads 18 for external connection, which correspond individually to the voltage detecting portion $P_{Z2}$ by the wiring pattern L. Also, the other end side of the piezoresistant portion $R_{Z2}$ and the other end side of the piezoresistant portion $R_Z$ of the supporting portion 5b each are electrically connected to the electrode pads 18 for external connection in order to connect to an external voltage source Vs, with the wiring pattern L. Also, the other end side of the piezoresistant portion $R_{Z4}$ and the other end side of the piezoresistant portion $R_Z$ of the supporting portion 5a are each electrically connected to the electrode pads 18 for external connection in order to connect to the external ground GND, with the wiring pattern L.

Figure 6C:
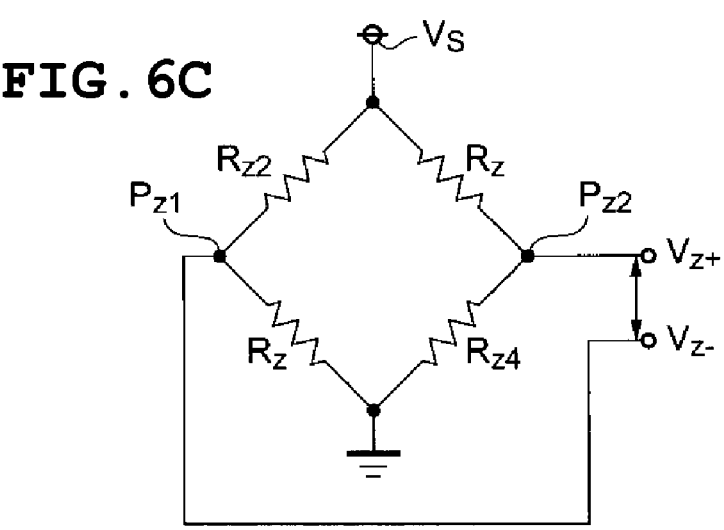
FIG. 6C is a circuit diagram for describing a bridge circuit which defines a Z-axis direction acceleration detecting portion of the acceleration sensor in the first preferred embodiment of the present invention.

With the first preferred embodiment, the piezoresistant portions are provided so that the resistance values of the four piezoresistant portions which define each bridge circuit shown in FIGS. 6A through 6C are balanced when acceleration is not occurring.

The acceleration sensor 1 in the first preferred embodiment is configured as described above, and detects acceleration as will be described below. For example, when acceleration occurs in the X-axis direction, the force originating from the acceleration in the X-axis direction acts against the weight portions 7 (7a and 7b). With the acting force in the X-axis direction towards the weight portions 7, the weight portions 7 (7a and 7b) swing and are displaced in the X-axis direction from the baseline state shown by the dotted line in the model diagram in FIG. 8A, as shown by the solid lines in FIG. 8A and the schematic cross-sectional diagram in FIG. 8B, for example. With such a displacement of the weight portions 7 in the X-axis direction, the beam portion 4 flexes via the connecting portion 8, and thus the, following stress is placed upon the beam portion 4.

Figure 8A:
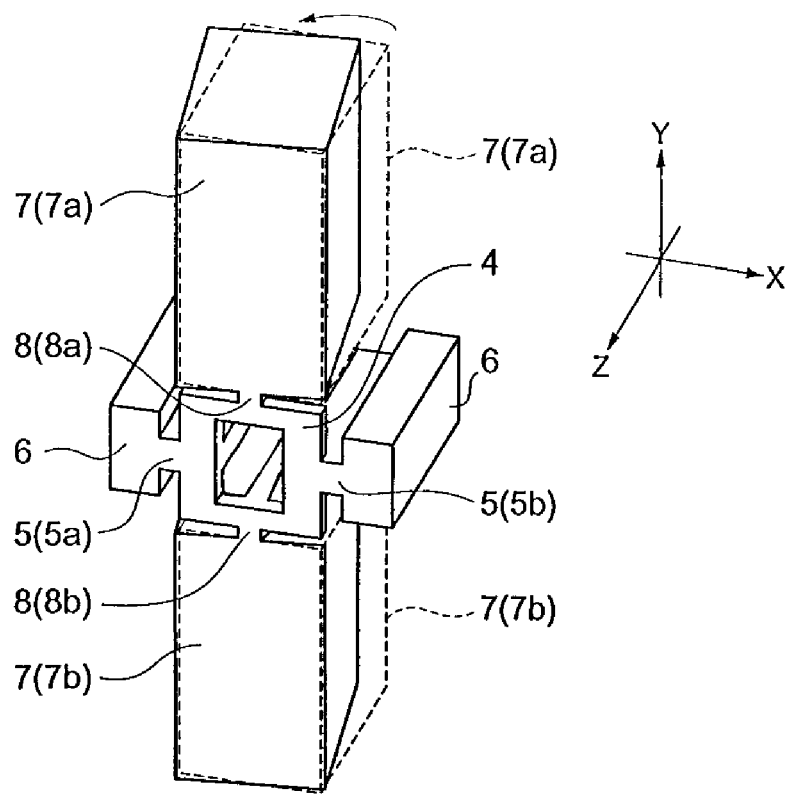
FIG. 8A is a schematic perspective view for describing an example of displacement of a weight portion originating from the acceleration in the X-axis direction in the acceleration sensor according to a preferred embodiment of the present invention.
Figure 8B:
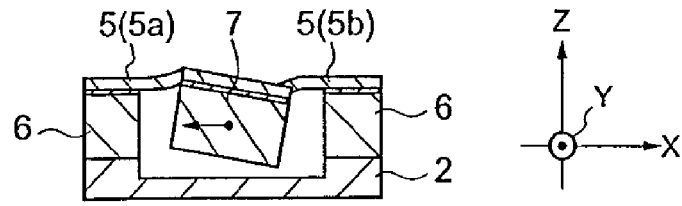
FIG. 8B is a cross-sectional view for describing an example of displacement of a weight portion originating from the acceleration in the X-axis direction in the acceleration sensor according to a preferred embodiment of the present invention.
Figure 8C:
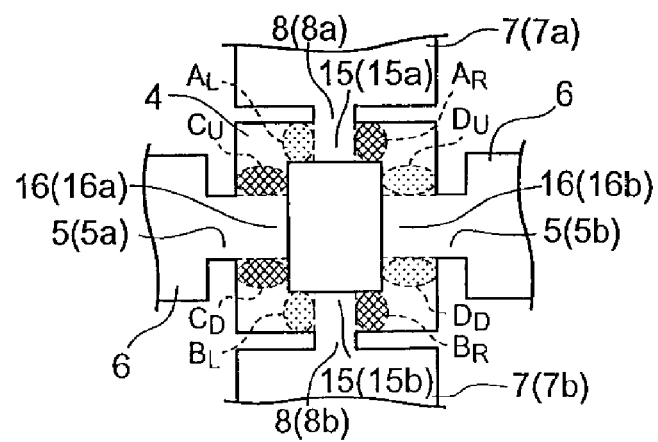
FIG. 8C is a model diagram for describing an example of a generating state of stress which is generated in the beam portion by the bending deformation of the beam portion originating from the acceleration in the X-axis direction.

For example, when the weight portions 7 are displaced as shown in FIGS. 8A and 8B, as illustrated in the model diagram in FIG. 8C with the beam portion 4, tension stress occurs on the left side $A_L$ of the band-shape beam portion on the connecting portion side 15a, and compression stress occurs on the right side $A_R$ of the band-shape beam portion on the connecting portion side 15a, Further, tension stress occurs on the left side $B_L$ of the band-shape beam portion on the connecting portion side 15b, and compression stress occurs on the right side $B_R$ of the band-shape beam portion on the connecting portion side 15b in the beam portion 4. Also, compression stress occurs on both sides $C_U$ and $C_D$ of the band-shape beam portion on the supporting portion side 16a, and tension stress occurs on both sides $D_U$ and $D_D$ of the band-shape beam portion on the supporting portion side 16b. Thus, piezoresistant portions $R_{X2}$, $R_{X1}$, $R_{X3}$, $R_{X4}$, $R_{Y2}$, $R_{Y3}$, $R_{Y1}$, $R_{Y4}$, $R_{Z2}$, $R_{Z4}$ are provided on the respective portions $A_L$, $A_R$, $B_L$, $B_R$, $C_U$, $C_D$, $D_U$, $D_D$ of the beam portion 4 on which stress occurs which originates from the acceleration in the X-axis direction of the weight portion 7. The electrical resistance value of each of the piezoresistant portions $R_{X2}$, $R_{X1}$, $R_{X3}$, $R_{X4}$, $R_{Y2}$, $R_{Y3}$, $R_{Y1}$, $R_{Y4}$, $R_{Z2}$, $R_{Z4}$ varies based on the stress which originates from the acceleration in the X-axis direction. With the bridge circuit in FIG. 6B, when acceleration occurs in the X-axis direction, the piezoresistant portions $R_{Y1}$ and $R_{Y4}$, for example, indicate resistance value variance based on tension stress, whereas the piezoresistant portions $R_{Y2}$, $R_{Y3}$, for example, indicate resistance value variance based on compression stress, and so the resistance values of the piezoresistant portions $R_{Y1}$, $R_{Y4}$ and the piezoresistant portions $R_{Y2}$ and $R_{Y3}$ vary in the reverse positive/negative (increase/decrease) direction from the baseline resistance value when there is no acceleration. Therefore, the resistance value variances between the piezoresistant portions $R_{Y1}$ and $R_{Y3}$ and the piezoresistant portions $R_{Y2}$ and $R_{Y3}$ cancel each other out, such that there is not a large variance to the output of the bridge circuit in FIG. 6B.

Also, there is virtually no stress variance to the arranging portion of the piezoresistant portions $R_Z$, $R_Z$ which define the bridge circuit in FIG. 6C. Also, the piezoresistant portion $R_{Z2}$ indicates a resistance value variance based on compression stress, for example, and the piezoresistant portion $R_{Z4}$ indicates a resistance value variance based on tension stress, for example, so that the piezoresistant portions $R_{Z2}$ and $R_{Z4}$ vary in the reverse positive/negative (increase/decrease) direction from the baseline resistance value when there is no acceleration. Therefore the resistance value variances of the piezoresistant portions $R_{Z2}$ and $R_{Z4}$ cancel each other out, such that there is not a large variance to the output of the bridge circuit in FIG. 6C.

Conversely, with the bridge circuit in FIG. 6A, when acceleration occurs in the X-axis direction, the piezoresistant portions $R_{X1}$ and $R_{X4}$, for example, indicate resistance value variance based on compression stress, whereas the piezoresistant portions $R_{X2}$ and $R_{X3}$, for example, indicate resistance value variance based on tension stress, such that the balanced state of the resistance values of the bridge circuit in FIG. 6A becomes unbalanced, and output of the bridge circuit in FIG. 6A varies. Since the variance width of the output of the bridge circuit in FIG. 6A varies according to the amount of acceleration in the X-axis direction, the amount of acceleration in the X-axis direction is detected based on the output of the bridge circuit in FIG. 6A.

When acceleration occurs in the Y-axis direction, the force originating from the acceleration in the Y-axis direction acts against the weight portion 7 (7a and 7b). With the first preferred embodiment, the height position of the center-of-gravity position of the weight portion 7 and the fulcrum position of the beam portion 4 which supports the weight portions 7 are shifted from one another, so that when force is applied to the weight portions 7 (7a and 7b) in the Y-axis direction due to the position shifting of the center-of-gravity and the fulcrum, and as shown with the solid line in FIG. 9A and the schematic cross-sectional diagram in FIG. 9B, the weight portions 7a and 7b vary in the Y-axis direction while moving closer to the base 2 on one side of the weight portions 7a and 7b (weight portion 7a in the example of FIGS. 9A and 9B), from the baseline state shown with a dotted line in the model diagram in FIG. 9A, and the other side of the weight portions 7a and 7b (weight portion 7b in the example of FIGS. 9A and 9B) moves farther from the base 2 and varies in the Y-axis direction. Thus, the connection portions 8 and the beam portion 4 are subjected to deformation, and stress is imposed on the beam portion 4.

Figure 9A:
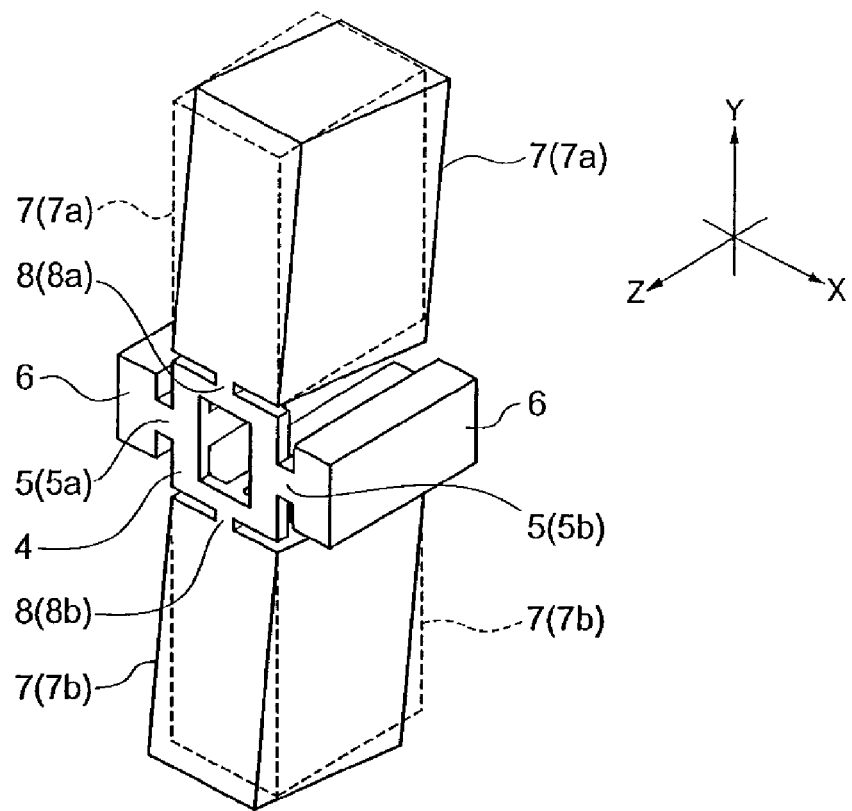
FIG. 9A is a schematic perspective view for describing an example of displacement of a weight portion originating from the acceleration in the Y-axis direction in the acceleration sensor according to a preferred embodiment of the present invention.
Figure 9B:
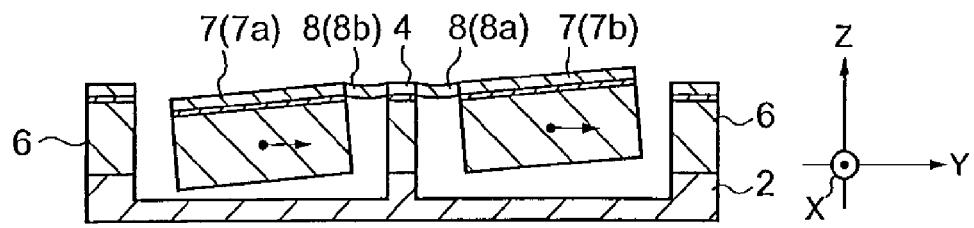
FIG. 9B is a cross-sectional view for describing an example of displacement of a weight portion originating from the acceleration in the Y-axis direction in the acceleration sensor according to a preferred embodiment of the present invention.
Figure 9C:
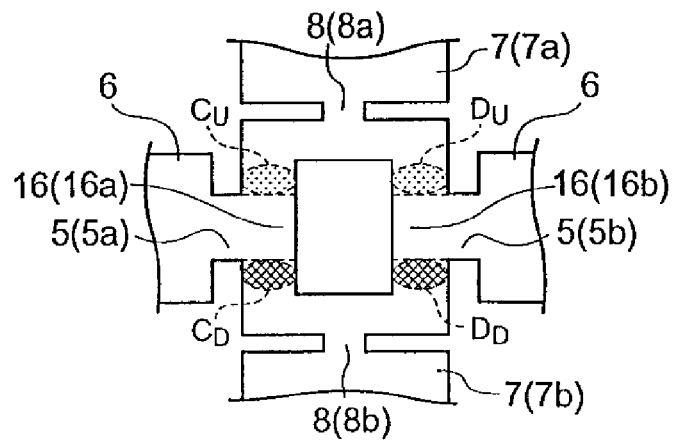
FIG. 9C is a model diagram for describing an example of a generating state of stress which is generated in the beam portion by the bending deformation of the beam portion originating from the acceleration in the Y-axis direction.

For example, when the weight portions 7 vary as indicated in FIGS. 9A and 9B, as shown in the model diagram in FIG. 9C, with the beam portion 4, tension stress occurs in the upper side $C_U$ of the band-shape beam portion on the supporting portion side 16a, and compression stress occurs on the lower side $C_D$ of the band-shape beam portion on the supporting portion side 16a. In addition, tension stress occurs in the upper side $D_U$ of the band-shape beam portion on the supporting portion side 16b, and compression stress occurs on the lower side $D_D$ of the band-shape beam portion on the supporting portion side 16b. Thus, piezoresistant portions $R_{Y2}$, $R_{Y3}$, $R_{Y1}$, $R_{Y4}$, are provided on the respective portions $C_U$, $C_D$, $D_U$, $D_D$ of the beam portion 4 on which stress originates from the acceleration in the Y-axis direction of the weight portions 7. The electrical resistance value of each of the piezoresistant portions $R_{Y2}$, $R_{Y3}$, $R_{Y1}$, $R_{Y4}$, varies based on the stress originates from the acceleration in the Y-axis direction. With the bridge circuit in FIG. 6B, when acceleration occurs in the Y-axis direction, the piezoresistant portions $R_{Y1}$ and $R_{Y2}$, for example, indicate resistance value variance based on tension stress, whereas the piezoresistant portions $R_{Y3}$ and $R_{Y4}$, for example, indicate resistance value variance based on compression stress, such that the resistance values of the bridge circuit in FIG. 6B loses the balance of the balanced state, the output of the bridge circuit in FIG. 6B varies. Since the variance width of the output of the bridge circuit in FIG. 6B varies according to the amount of acceleration in the Y-axis direction, the amount of acceleration in the Y-axis direction is detected based on the output of the bridge circuit in FIG. 6B.

In the first preferred embodiment, the piezoresistant portion $R_{Z2}$ is arranged on the upper side $C_U$ of the band-shape beam portion on the supporting portion side 16a, and the piezoresistant portion $R_{Z4}$ is arranged on the lower side $D_D$ of the band-shape beam portion on the supporting portion side 16b. The resistance values of the piezoresistant portions $R_{Z2}$ and $R_{Z4}$ vary due to the stress occurring in the beam portion 4 which originates from the acceleration in the Y-axis direction, but the resistance value of the piezoresistant portion $R_{Z2}$ varies based on tension stress, for example, and the resistance value of the piezoresistant portion $R_{Z4}$ varies based on compression stress, for example. Thus, the resistance values of the piezoresistant portions $R_{Z2}$ and $R_{Z4}$ vary in the reverse positive/negative direction from the baseline resistance value when there is no acceleration, and therefore, the resistance value variances of the piezoresistant portions $R_{Z2}$ and $R_{Z4}$ cancel each other out, such that there is not a large variance to the output of the bridge circuit in FIG. 6C. Also, the piezoresistant portions $R_{x1}$, $R_{x2}$, $R_{x3}$, $R_{x4}$ which define the bridge circuit in FIG. 6A are arranged on a portion where there is virtually no stress variance when acceleration occurs in the Y-axis direction, so that there is virtually no variance to the resistance values of the piezoresistant portions $R_{X1}$, $R_{X2}$, $R_{X3}$, $R_{X4}$, and there is not a large variance to the output of the bridge circuit in FIG. 6B.

For example, when acceleration occurs in the Z-axis direction, the force originating in the acceleration thereof in the Z-axis direction acts upon the weight portion 7 (7a and 7b). With the acting force in the Z-axis direction towards the weight portions 7, the weight portions 7 (7a and 7b) are displaced in the Z-axis direction from the baseline state shown by the dotted line in the model diagram in FIG. 10A, as shown by the solid lines in FIG. 9A and the schematic cross-sectional diagram in FIG. 10B, for example. Thus, the connecting portions 8 and the beam portion 4 are subjected to bending deformation, and the following stress is imposed upon the beam portion 4.

Figure 10A:
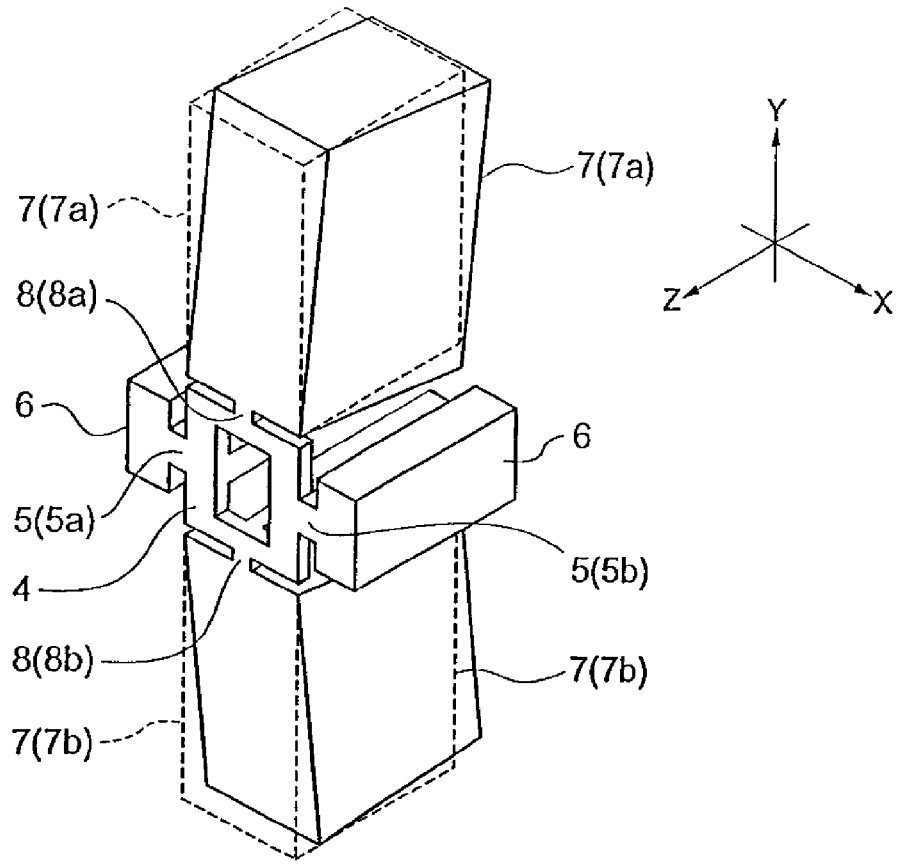
FIG. 10A is a schematic perspective view for describing an example of displacement of a weight portion originating from the acceleration in the Z-axis direction in the acceleration sensor according to a preferred embodiment of the present invention.
Figure 10B:
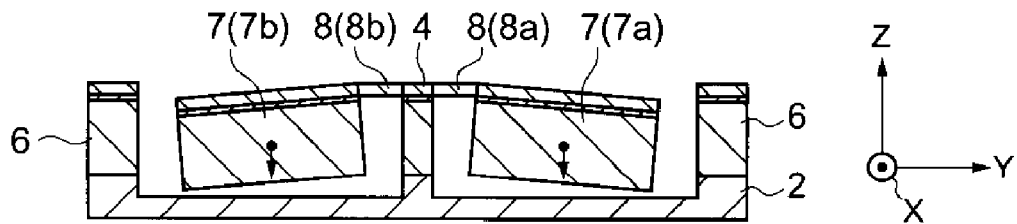
FIG. 10B is a cross-sectional view for describing an example of displacement of a weight portion originating from the acceleration in the Z-axis direction in the acceleration sensor according to a preferred embodiment of the present invention.
Figure 10C:
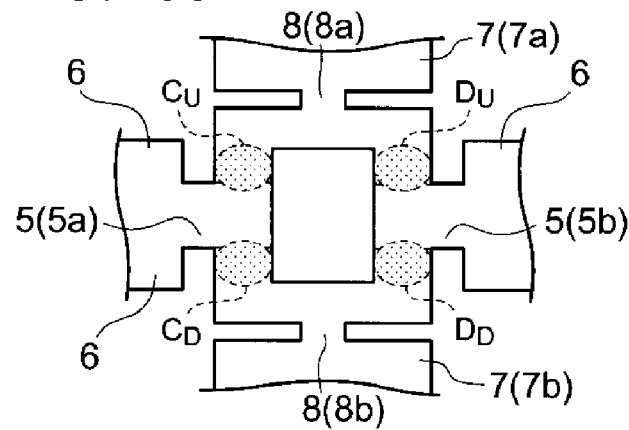
FIG. 10C is a model diagram for describing an example of a generating state of stress which is generated in the beam portion by the bending deformation of the beam portion originating from the acceleration in the Z-axis direction.

For example, when the weight portions 7 are displaced, as shown in FIGS. 10A and 10B, as shown in the model diagram in FIG. 10C, tension stress occurs on both sides $C_U$, $C_D$, $D_U$, $D_D$ on each of the band-shape beam portions on the support portion sides 16a and 16b in the beam portion 4. Thus, as stress is imposed on the beam portion 4, the electrical resistance value of the piezoresistant portions $R_{Z2}$ and $R_{Z4}$, which are arranged on each of the single sides of each of the band-shape beam portions on the support portion sides 16a and 16b, varies with the tension stress. Also, in the first preferred embodiment, the piezoresistant portion $R_Z$ is arranged on a portion with virtually no stress variance from the acceleration in the Z-axis direction, and the electrical resistance value of the piezoresistant portion $R_Z$ is virtually non-existent. Thus, when there is acceleration in the Z-axis direction, the balanced state of the resistance value in the bridge circuit in FIG. 6C loses the balance thereof, and the output of the bridge circuit in FIG. 6c varies. Since the variance width of the output of the bridge circuit in FIG. 6C varies according to the amount of acceleration in the Z-axis direction, the amount of acceleration in the Z-axis direction is detected based on the output of the bridge circuit in FIG. 6C.

Now, the beam portions whereupon the piezoresistant portions $R_{X1}$, $R_{X2}$, $R_{X3}$, $R_{X4}$ which define the bridge circuit in FIG. 6A are arranged have virtually no stress originating from the acceleration in the Z-axis direction, so that the balanced state of the resistance values of the bridge circuit in FIG. 6A is maintained, and there is virtually no output variance of the bridge circuit in FIG. 6A. Also, the beam portions whereupon the piezoresistant portions $R_{Y1}$, $R_{Y2}$, $R_{Y3}$, $R_{Y4}$ which define the bridge circuit in FIG. 6B are arranged each have similar stress occurring, and the resistance values of the piezoresistant portions $R_{Y1}$, $R_{Y2}$, $R_{Y3}$, $R_{Y4}$ vary similarly. Thus, when there is acceleration in the Z-axis direction, the balanced state of the resistance value of the bridge circuit in FIG. 6B is maintained, and there is virtually no output variance of the bridge circuit in FIG. 6B.

The acceleration sensor 1 according to the first preferred embodiment detects acceleration separately in each of the three-axis directions of the X-axis direction and the Y-axis direction and the Z-axis direction.

In the first preferred embodiment, the beam portion 4 is supported by the fixed portion 6 via the supporting portions 5 (5a and 5b), such as a beam supported by at both ends thereof, and the weight portions 7 (7a and 7b) are supported by the beam 4 in a cantilever beam shape by the connecting portion 8 (8a and 8b). Thus, the distance between the location of the fixed portion 6 which is connected to the supporting portion 5a and the location of the fixed portion 6 which is connected to the supporting portion 5b is reduced. Thus, even if the base 2 or the fixed portion 6 is distorted by, for example, ambient temperature changes, the absolute displacement of distortion is small between the fixed portion locations originating from the distortion of the base 2 or the fixed portion 6. Also, the beam portion 4 has a frame-shape, and the frame-shaped beam portion 4 is supported by the fixed portion 6 via the supporting portions 5 (5a and 5b), such as a beam supported by its both ends, and therefore, in the event of stress occurring in the X-axis direction from the distortion of the base 2 or the fixed portion 6, the squared areas of the beam portion 4 are deformed so as to allow the stress to escape. Further, in the event of stress occurring in the Y-axis direction from the distortion of the base 2 or the fixed portion 6, the supporting portions 5 (5a and 5b) are deformed so as to allow the stress to escape. Thus, flexing of the beam portion 4 which originates from the distortion of the base 2 or the fixed portion 6 is alleviated. Therefore, the problems caused by the ambient temperature changes (for example, the problem of temperature drift wherein the output voltage value varies with the temperature shift of the respective bridge circuits in FIG. 6a through 6c) are suppressed.

Also, with the first preferred embodiment, piezoresistant portions are arranged in a concentrated manner so as to detect acceleration in the beam portion 4 which is arranged in the area between the weight portions 7a and 7b. Thus, all of the piezoresistant portions can be fabricated approximately according to the design thereof, and inconsistency in the output of the bridge circuits shown in FIGS. 6A through 6C is easily maintained at a minimum. In other words, the piezoresistant portions are manufactured by doping the Si which defines the beam portion 4 with boron (B) or phosphorus (P). However, since the arrangement position of the piezoresistant portions is concentrated, the doping concentration of boron or phosphorus on the respective piezoresistant portions is easily maintained to be consistent. Therefore, the resistance values of the respective bridge circuits are more easily balanced, and the precision of the acceleration detection is improved.

Further, in the first preferred embodiment, all of the piezoresistant portions are arranged in a concentrated manner, so that the drawing paths for the wiring patterns to define the respective bridge circuits shown in FIGS. 6A through 6C are simplified.

Further, in the first preferred embodiment, the beam portion 4 is symmetrical to the central axis in the Y-axis direction which passes through the central axis along the Y-axis direction of the connecting portions 8a and 8b, and is also symmetrical to the central axis in the X-axis direction which passes through the central axis along the X-axis direction of the supporting portions 5a and 5b. Therefore, the bending deformation of the beam portion 4 originating from the acceleration occurring is simplified, and the precision of the acceleration detection using stress variances of the bending deformation of the beam portion 4 is improved.

Further, in the first preferred embodiment, the thickness in the Z-axis direction of the band-shape beam portion on the connecting portion side 15 (15a and 15b) and the supporting portion side 16 (16a and 16b) is thicker than the thickness in the other portions of the beam portion 4. Because of this difference in thickness, there is a difference in the strength of the stress at the boundary portions between the band-shape beam portions on the connecting portion side 15 (15a and 15b) and the supporting portion side 16 (16a and 16b) and the other portions of the beam portion 4. In the first preferred embodiment, acceleration is detected using the stress variations of the beam portion 4, and thus, by identifying the strength of the stress thereof, the acceleration in the three-axis directions of the X-axis direction and the Y-axis direction and the Z-axis direction is more clearly separated and detected.

A second preferred embodiment will be described below. With the description of the second preferred embodiment, those portions with the same configuration as the first preferred embodiment have the same reference numerals, and duplicate description of these portions is omitted.

Figure 11:
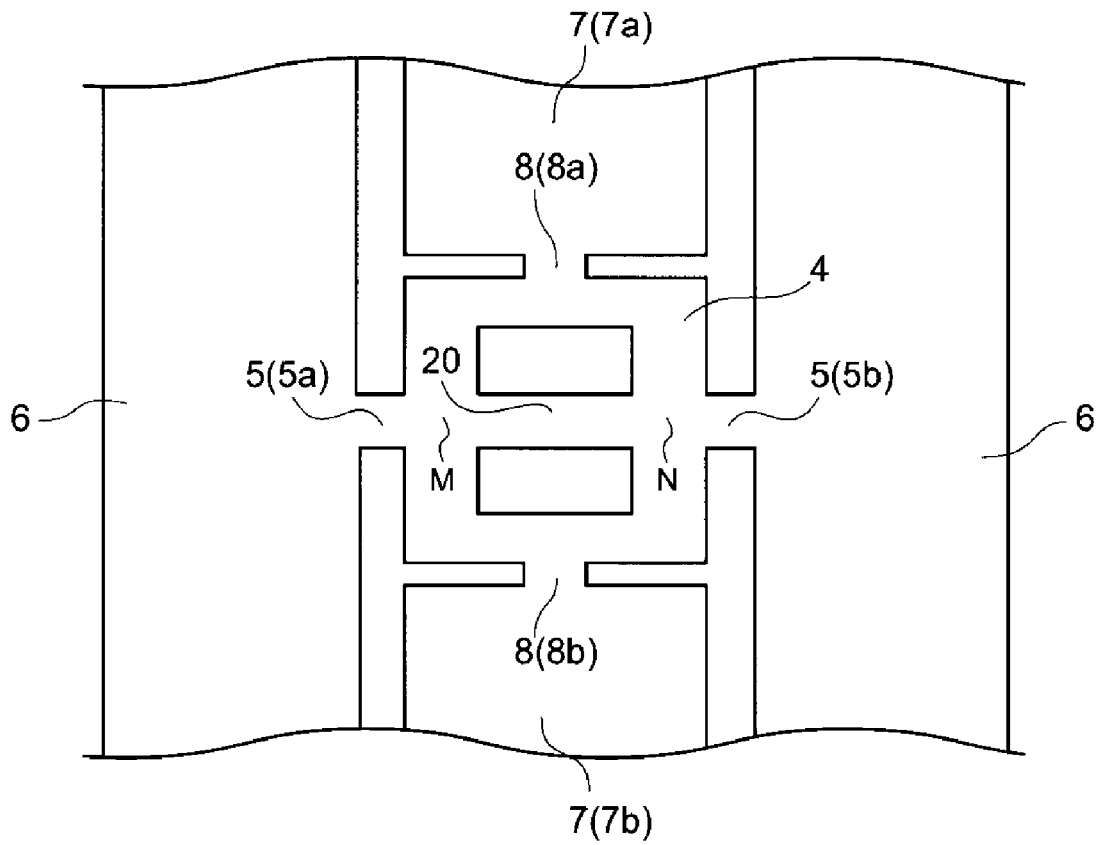
FIG. 11 is a model diagram for describing an acceleration sensor in a second preferred embodiment of the present invention.

With the second preferred embodiment, in addition to the configuration of the first preferred embodiment, a reinforcing portion 20 is preferably provided on the frame-shaped beam portion 4, as shown in FIG. 11. The reinforcing portion 20 is elongated along a straight line which links the location M of the beam portion 4 which is connected to the supporting portion 5a and the location N of the beam portion 4 which is connected to the supporting portion 5b, and both ends of the reinforcing portion 20 are each connected to an internal edge portion of the beam portion 4, within a spatial area which is surrounded by the frame-shaped beam portion 4. By providing the reinforcing portion 20, the rigidity of the beam portion 4 is improved, and for example, the bending deformation of the beam portion 4 which originates from the distortion of the base 2 or the fixed portion 6 is suppressed to a minimum. Thus, detection errors of the acceleration originating from the distortion from thermal heat, for example, from the base 2 or the fixed portion 6 is prevented.

In the example in FIG. 11, the width of the reinforcing portion 20 is the same width as the width of the supporting portions 5 (5a and 5b), but the width of the reinforcing portion 20 can be thicker or thinner than the width of the supporting portions 5 (5a and 5b). Also, the thickness of the reinforcing portion 20 in the Z-axis direction can be a similar thickness as the thickness of the supporting portions 5 (5a and 5b), or can be thinner than the thickness of the supporting portions 5 (5a and 5b). Thus, the width or thickness of the reinforcing portion 20 can be designed appropriately based on the rigidity of the beam portion 4.

The third preferred embodiment will be described below. With the description of the third preferred embodiment, those portions having the same configuration as the first or second preferred embodiment have the same reference numerals, and duplicate description of these shared portions is omitted.

Figure 12:
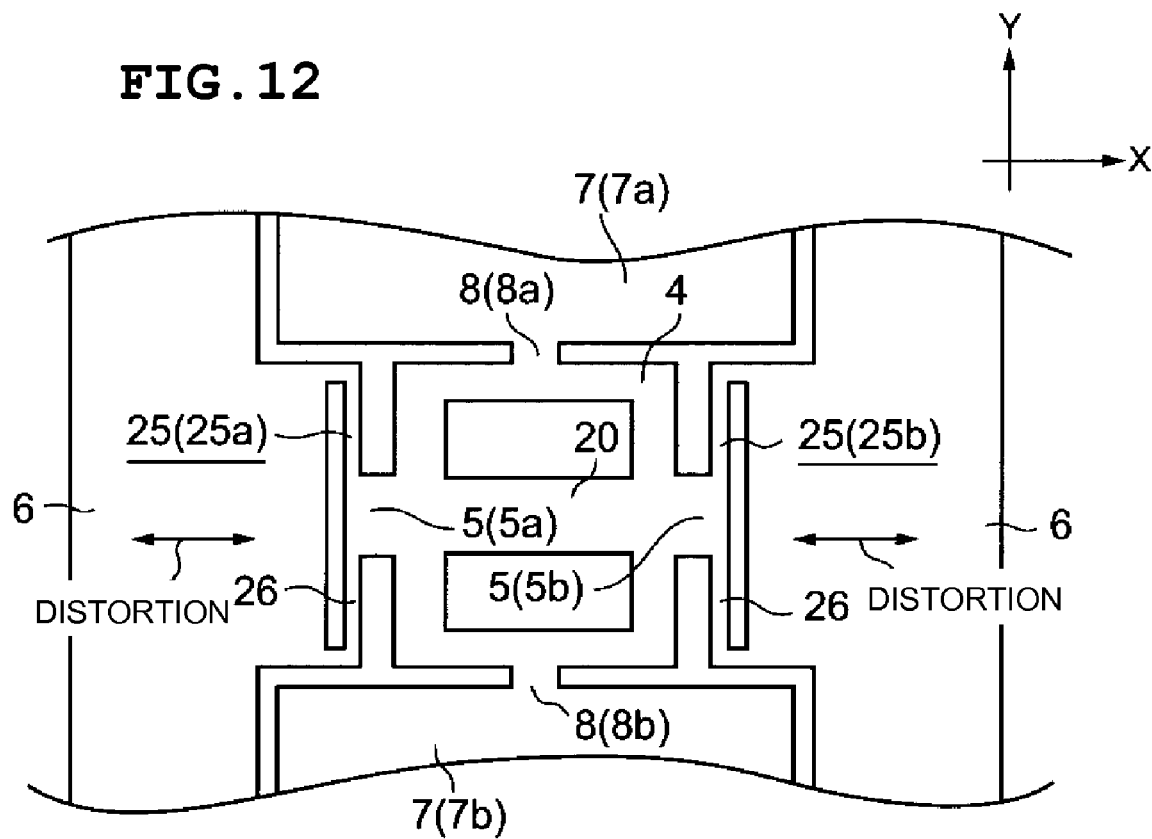
FIG. 12 is a model diagram for describing an acceleration sensor in a third preferred embodiment of the present invention.

With the third preferred embodiment, as illustrated in FIG. 12, the supporting portions 5 (5a and 5b) are each connected to the fixed portion 6 via elastic portions 25 (25a and 25b). Any configuration of an acceleration sensor of the third preferred embodiment other than the above-mentioned configuration is similar to that of the first or second preferred embodiment.

The elastic portions 25 (25a and 25b) in the third preferred embodiment include a beam (stress-reducing beam) 26 which is elongated in the direction to intersect (the Y-axis direction in this example) with the elongation direction (X-axis direction) of the supporting portion 5 (5a and 5b), and the beam 26 has both ends thereof affixed to the fixed portion 6. The supporting portion 5 (5a and 5b) is connected to the central portion of the beam 26. This beam 26 is elastically deformed according to the distortion of the fixed portion 6 in the X-axis direction, and by this elastic deformation, the stress imposed on the supporting portions 5 from the fixed portion 6 which originates from the distortion of the fixed portion 6 is decreased. If the beam 26 can be elastically deformed according to the distortion of the fixed portion 6, the width thereof or the thickness in the Z-axis direction are not restricted to particular ones. However, in the third preferred embodiment, the thickness of the beam 26 in the Z-axis direction is similar to that as the band-shape beam portion on the supporting portion side in the fixed portion 6 or beam portion 4.

In the third preferred embodiment, by providing an elastic portion 25, for example, stress imposed on the supporting portions 5 from the fixed portion 6 which originates from the distortion of the base 2 or the fixed portion 6, such as thermal fluctuation is reduced. This has been confirmed by experiment (simulation) by the present inventor. With this experiment, a sample A having a configuration of the acceleration sensor according to the first preferred embodiment (see FIG. 1 for example), a sample B having a configuration with the reinforcing portion 20 according to the second preferred embodiment in addition to the configuration in sample A (see FIG. 11), and further, a sample C having a configuration with an elastic portion 25 according to the third preferred embodiment in addition to the configuration in sample B, were prepared. Then for each of the samples A through C, stress was simulated on the portions on which the piezoresistant portions are provided on the beam portion 4. The results are displayed in Table 1. Here, the stress at the piezoresistant portions on the beam portion 4 in sample A is assumed to be 1.00, and for samples B and C, a relative value to sample A is used.

TABLE 1

|  | Relative value |
| --- | --- |
| Sample A | 1.00 |
| Sample B | 0.25 |
| Sample C | 0.03 |

Figure 15A:
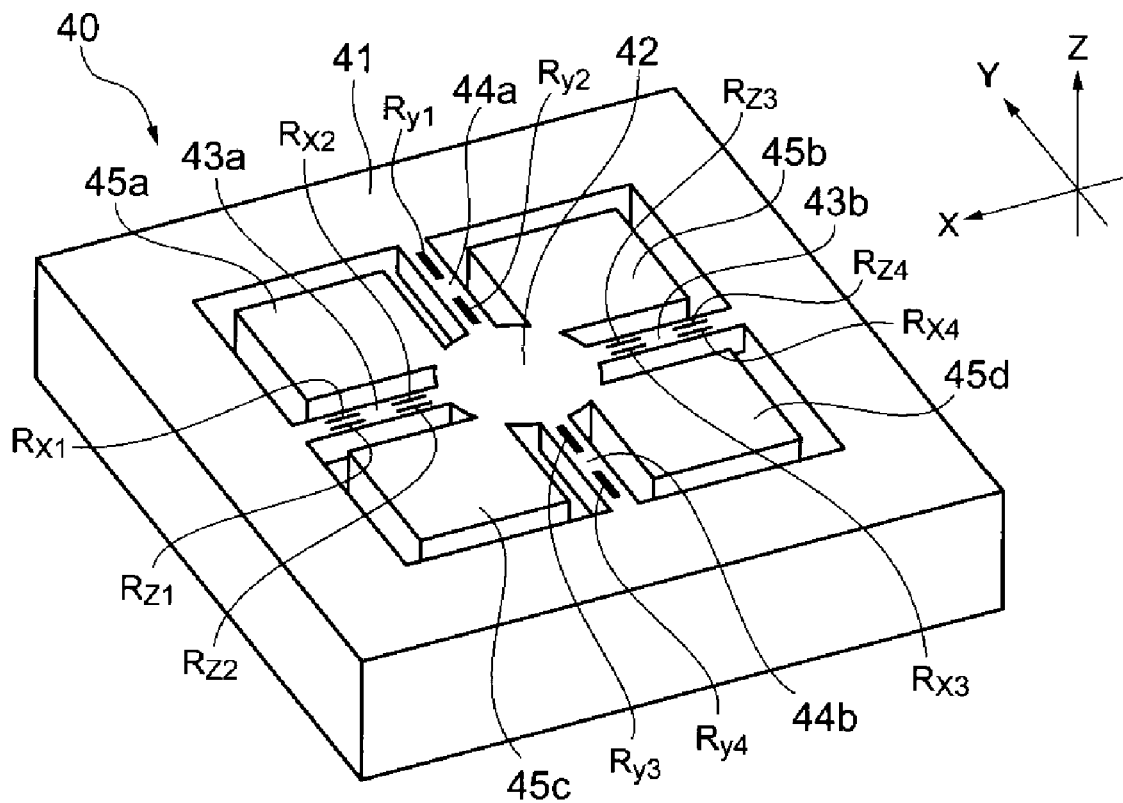
FIG. 15A is a schematic perspective view illustrating a conventional example of an acceleration sensor.
Figure 15B:
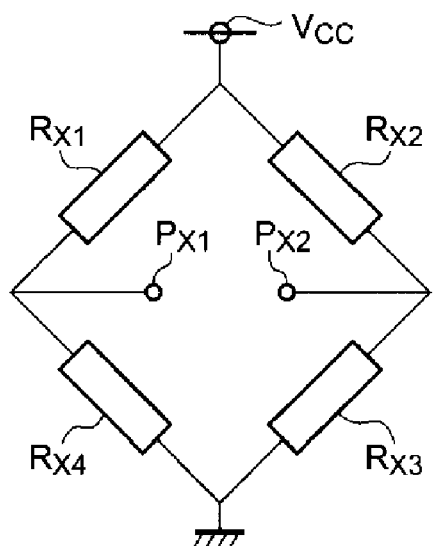
FIG. 15B is a circuit diagram describing a bridge circuit for detecting acceleration in the X-axis direction with the acceleration sensor shown in FIG. 15A.
Figure 15C:
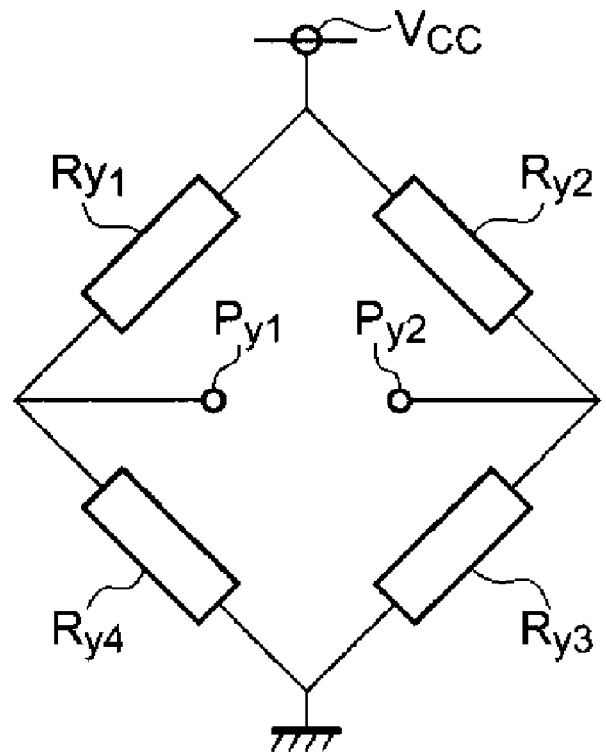
FIG. 15C is a circuit diagram describing a bridge circuit for detecting acceleration in the Y-axis direction with the acceleration sensor shown in FIG. 15A.
Figure 15D:
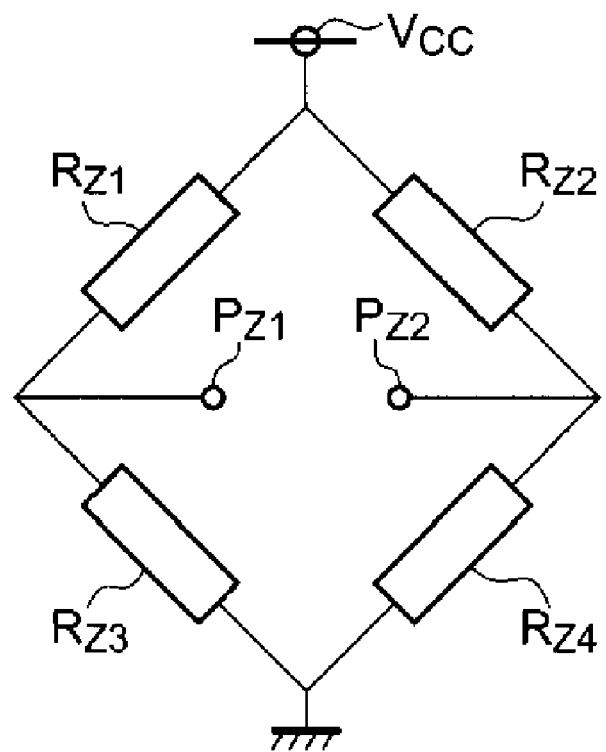
FIG. 15D is a circuit diagram describing a bridge circuit for detecting acceleration in the Z-axis direction with the acceleration sensor shown in FIG. 15A.

As is clear from Table 1, when the base 2 or the fixed portion 6 is distorted by thermal fluctuation, for example, the stress imposed on the beam portion 4 via the supporting portions 5 from the fixed portion 6 which originates from this distortion is decreased to a greater extent than with the configuration of the first preferred embodiment, by providing the reinforcing portion 20. Further, by providing the elastic portion 25, unnecessary stress imposed on the beam portion 4 which originated from the distortion of the base 2 or the fixed portion 6 is further decreased. Of course, even with the configuration in the first preferred embodiment, compared to an acceleration sensor such as that shown in FIG. 15A, for example, distortion of the beam portion originating from the distortion of the base or the fixed portion is controlled so as to be much smaller. For reference, stress was similarly simulated on the portions on which the piezoresistant portions are provided on the beam portions 43a, 43b, 44a, 44b originating from the distortion of the frame portion 41 on the acceleration sensor shown in FIG. 15A. The result of this can be displayed as a relative value of 7.67 as to the sample A (with a configuration of the first preferred embodiment). As is clear from this result, by providing a configuration shown in each of the first through third preferred embodiments, distortion of the beam portion originating from the distortion of the base or the fixed portion from thermal fluctuation, for example, is controlled so as to be smaller than that in the conventional configuration.

As described above, the distortion of the beam portion 4 originating from the distortion of the base 2 or the fixed portion 6 from thermal fluctuation, for example, are controlled so as to be smaller, and therefore, temperature drift of the output of the bridge circuit which include the piezoresistant portions for acceleration detecting is suppressed. Thus, reliability of acceleration detection is improved.

It should be noted that the present invention is not limited to the first through third preferred embodiments, and can be used for various other embodiments. For example, with the first through third preferred embodiments, each of the X-axis direction acceleration detecting portion, the Y-axis direction acceleration detecting portion, and the Z-axis direction acceleration detecting portion which detect acceleration include piezoresistant portions. However, for example, the displacement of the weight portions 7 can be detected using capacitance, and each of the acceleration in of the X-axis direction, the acceleration in the Y-axis direction, and the acceleration in the Z-axis direction can be detected.

Also, with the first through third preferred embodiments, the beam portion 4 is thicker in the Z-axis direction in the band-shape beam portion on the connecting portion side 15 (15a and 15b) and the band-shape beam portion on the supporting portion side 16 (16a and 16b) than in the other portions. However, the beam portion 4 may be configured to have approximately the same thickness in the Z-axis direction throughout.

Figure 13A:
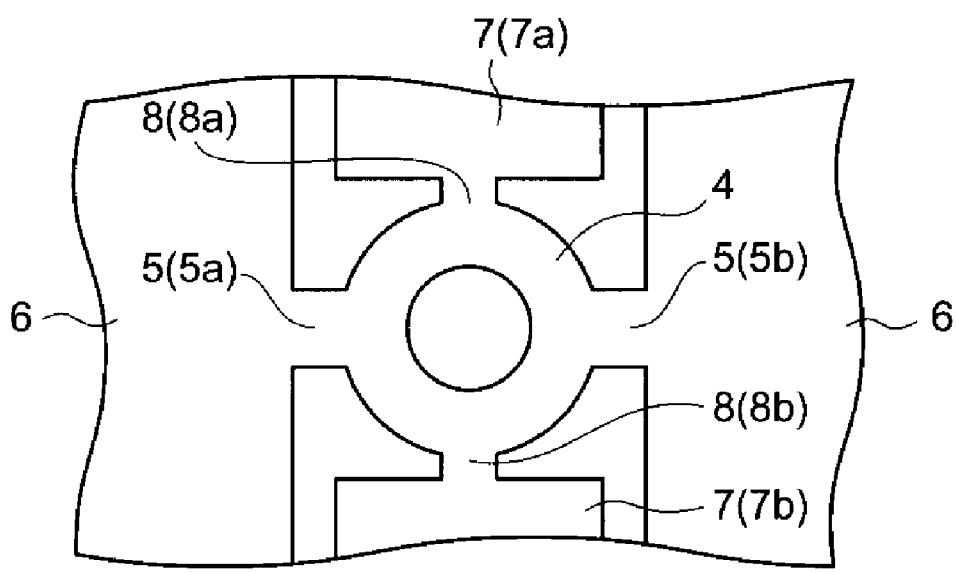
FIG. 13A is a model diagram for describing another preferred embodiment of the beam portion.
Figure 13B:
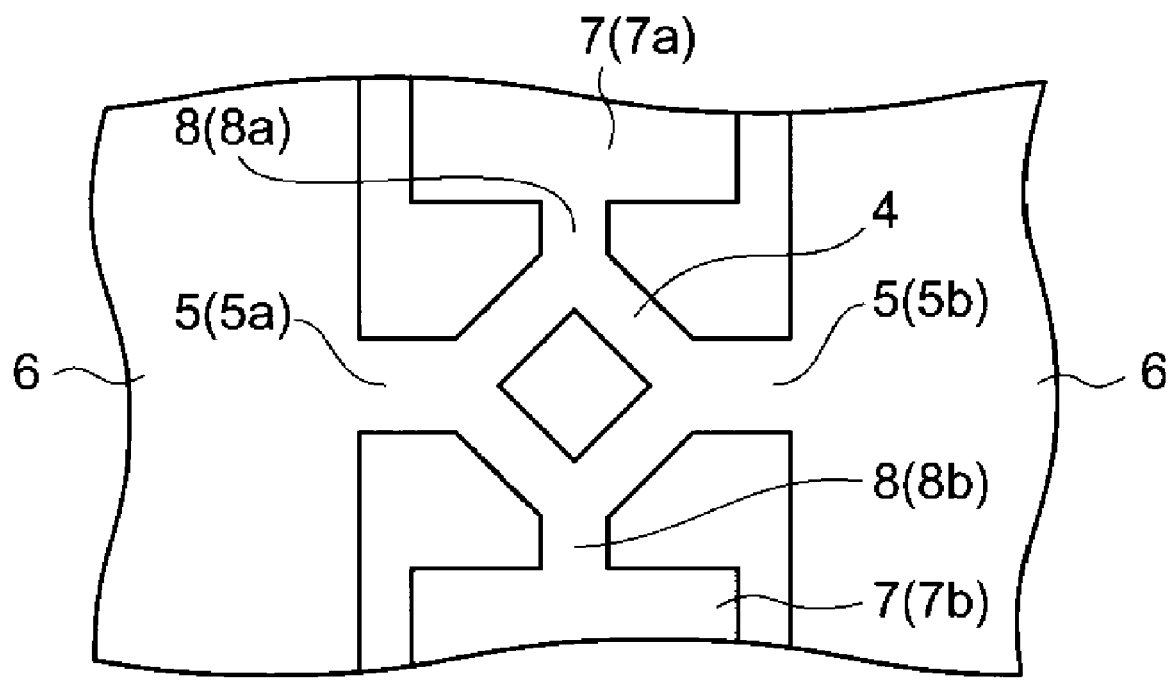
FIG. 13B is a model diagram for describing yet another preferred embodiment of the beam portion.
Figure 13C:
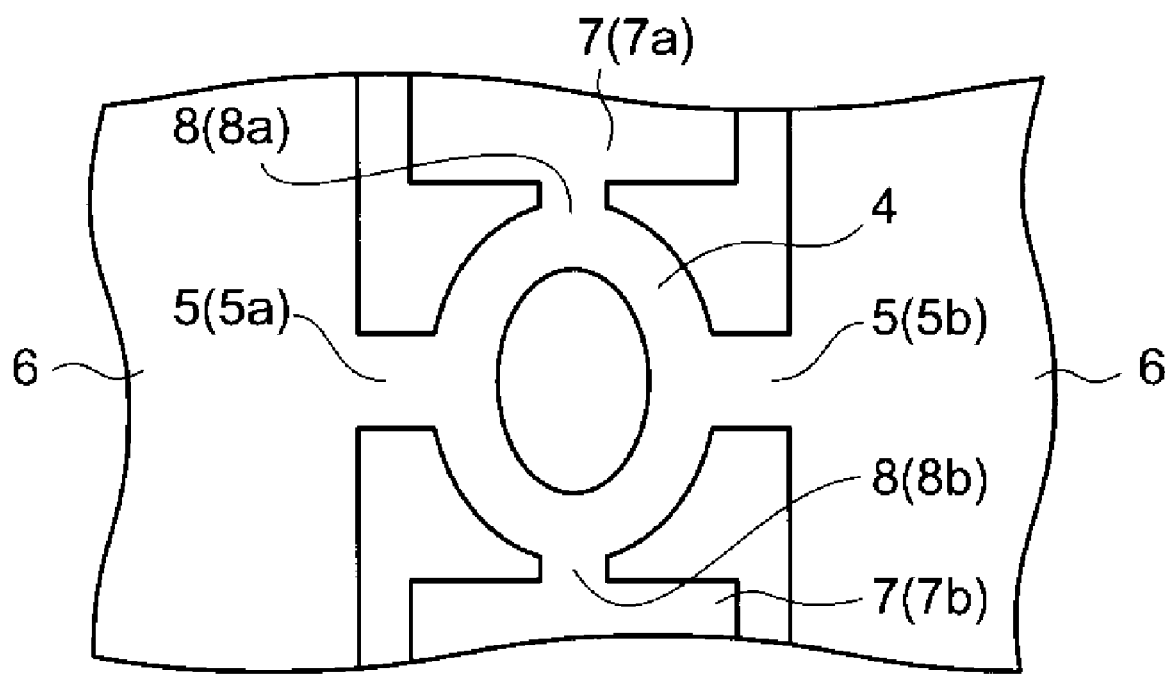
FIG. 13C is a model diagram for describing still yet another preferred embodiment of the beam portion.

Further, in the first through third preferred embodiments, the frame-shaped beam portion 4 preferably has a substantially square shape. However, for example, the frame-shaped beam portion 4 may have a substantially circular shape as shown in FIG. 13A, a diamond shape as shown in FIG. 13B, or an oval shape as shown in FIG. 13C. Also, the frame-shaped beam portion 4 is preferably symmetrical to the X-axis direction central axis and to the Y-axis direction central axis. However, the frame-shaped beam portion 4 may not be symmetrical to the X-axis direction central axis, and may not be symmetrical to the Y-axis direction central axis.

Figure 5:
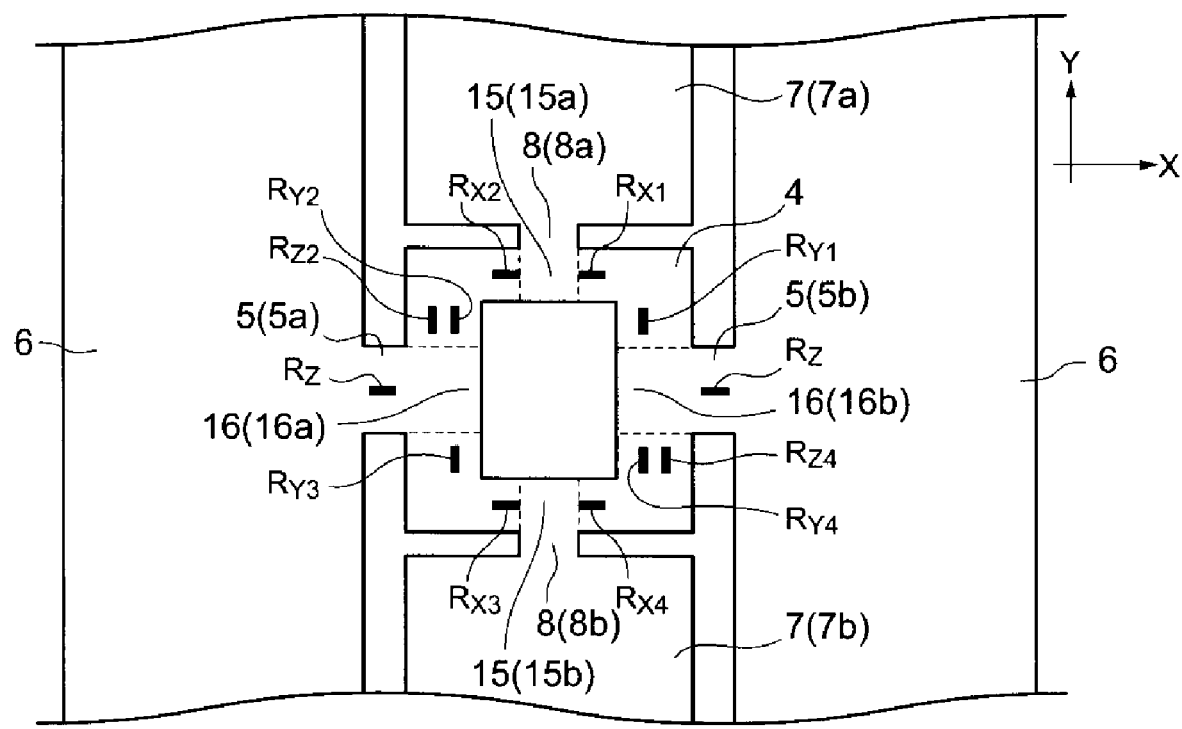
FIG. 5 is a diagram describing an example of an arrangement of piezoresistant portions which are provided on the beam portion.

Further, in the first through third preferred embodiments, the piezoresistant portions for detecting acceleration have been arranged as shown in FIG. 5. However, the arrangement positions of the piezoresistant portions are not limited to the arrangement positions shown in FIG. 5 and may be varied, as long as the X-axis direction acceleration, the Y-axis direction acceleration, and the Z-axis direction acceleration can be detected using stress variances caused by the bending deformation of the beam portion 4. Also, the wiring examples of the wiring patterns connecting each of the piezoresistant portions and define the bridge circuits can be set appropriately, and are not to be limited to the example in FIG. 7.

Figure 14A:
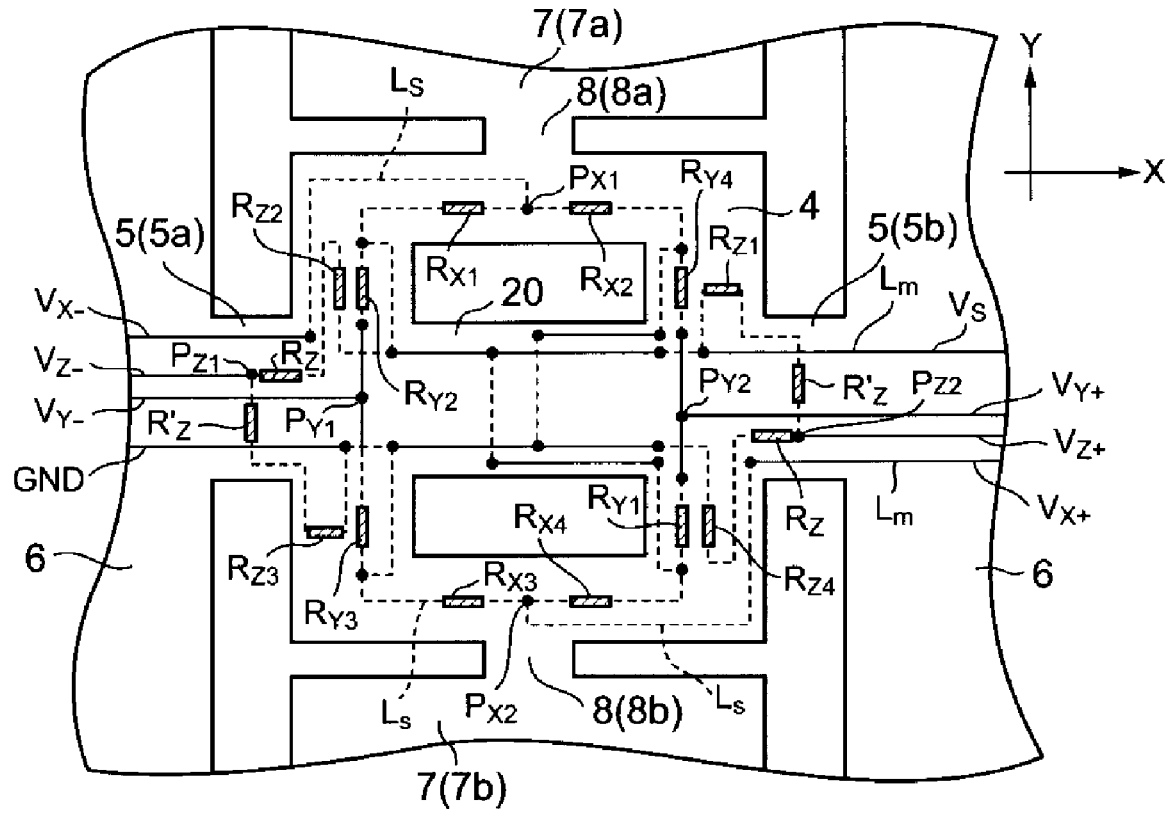
FIG. 14A is a schematic diagram for describing an example of an arrangement of a wiring pattern which connects the multiple piezoresistant portions provided on the beam portion and configure the bridge circuits.
Figure 14B:
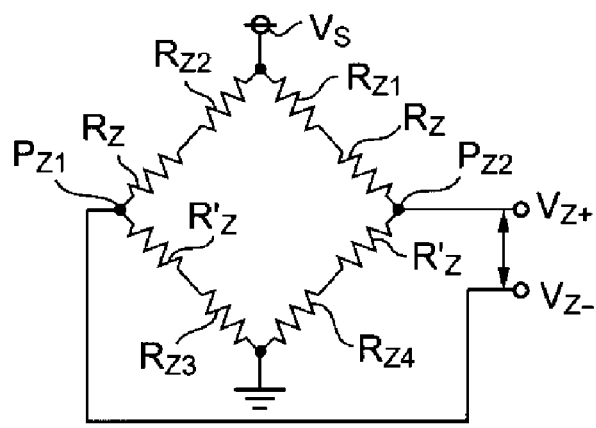
FIG. 14B is a circuit diagram illustrating a configuration of a bridge circuit which is configured by the piezoresistant portions and wiring patterns relating to the acceleration detection in the Z-axis direction shown in FIG. 14A.

For example, FIG. 14A shows another arrangement of the piezoresistant portions and a wiring pattern. In this example, a reinforcing portion 20, such as that shown in the second preferred embodiment, is provided on the beam portion 4. Also, in this example, in addition to the piezoresistant portions being provided similar to FIGS. 5 and 7, piezoresistant portions Rz', Rz' are provided on each of the supporting portions 5a and 5b, and a piezoresistant portion $R_{Z3}$ is provided on the lower side of the diagram of the band-shape beam portion on the supporting portion side 16a. Further, a piezoresistant portion $R_{Z1}$ is provided on the upper side of the diagram of the band-shape beam portion on the supporting portion side 16b. The piezoresistant portions Rz', Rz', $R_{Z1}$, $R_{Z3}$ are arranged to detect acceleration in the Z-axis direction along with the piezoresistant portions Rz, Rz, $R_{Z2}$, $R_{Z4}$ which are provided also in the examples in FIGS. 5 and 7. With the example in FIG. 14A, the piezoresistant portions $R_{Z1}$, $R_{Z3}$, Rz, Rz, have an elongated shape along the X-axis direction, and the piezoresistant portions Rz', Rz', $R_{Z2}$, $R_{Z4}$ are have an elongated shape along the Y-axis direction which are perpendicular to the elongation direction of the piezoresistant portions $R_{Z1}$, $R_{Z3}$, Rz, Rz. The piezoresistant portions relating to acceleration detecting define a bridge circuit, such as that shown in FIG. 14B, with a wiring pattern as described below.

Figure 14C:
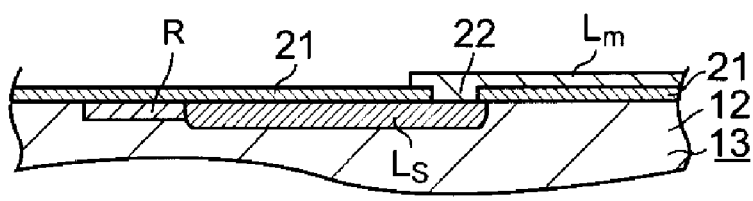
FIG. 14C is a schematic cross-sectional view for describing a preferred embodiment of the wiring pattern shown in FIG. 14A.

With the wiring pattern shown in FIG. 14A, a bridge circuit is defined by piezoresistant portions, such as that shown in the schematic cross-sectional diagram in FIG. 14C, with a wiring pattern Ls which is formed by doping the Si layer 12 of the SOI substrate 13 with boron or phosphate or other suitable material, and a wiring pattern Lm which is made of a metal, such as aluminum, which is formed using film formation techniques, such as vapor deposition or sputtering, on the surface of the SOI substrate 13. In FIG. 14A, the wiring pattern Ls is expressed with a dotted line, and the wiring pattern Lm is expressed with a sold line.

In the example in FIG. 14A, particular wiring patterns Ls, Lm are include the features described below. By having a oxide film 21 necessarily being formed on the surface of the Si layer 12 of the SOI substrate 13 after the formation of the wiring pattern Ls, cross-wiring of the wiring pattern Ls and the wiring pattern Lm is formed while ensuring the insulation of the wiring pattern Ls and the wiring pattern Lm. Also, a portion of the oxide film 21 is removed on which a portion of the wiring pattern Ls and a hole portion 22 are formed, and the conducting material defining the wiring pattern Lm enters the hole portion 22 and bonds to the wiring pattern Ls, so as to electrically connect the wiring pattern Ls to the wiring pattern Lm. Further, in the example of FIG. 14A, the supporting portions 5a and 5b, the band-shape beam portions on the connecting portion side 15a and 15b, the band-shape beam portions on the supporting portion side 16a and 16b on the beam portion 4, and the reinforcing portion 20 have a thickness of approximately 400 μm, for example, whereas the portions of the beam portion 4 other than the band-shape beam portions on the connecting portion side 15a and 15b and the band-shape beam portions on the supporting portion side 16a and 16b have a thickness of approximately 5 μm to 10 μm. If a metallic wiring pattern Lm is provided on a surface having such a thin portion of the beam portion 4, the thin portion of the beam 4 is likely to warp from the inner stress of the wiring pattern Lm. To counteract this, the wiring pattern Ls is formed by doping the Si layer, which defines the beam portion 4, with an impure substance such as boron or phosphate, and warping of the thin portion of the beam portion 4 by the formation of the wiring pattern Ls is prevented. Thus, a metallic wiring pattern Lm is not provided on the thin portion of the beam portion 4, and the wiring pattern Ls is provided on the thin portion of the beam portion 4.

In the example in FIG. 14A, the cross-wiring of the wiring pattern Ls and the wiring pattern Lm being and the simple electrical connection of the wiring pattern Ls and the wiring pattern Lm are provided so as to simplify the wiring configuration of the wiring pattern. Thus, with the example in FIG. 14A, the number of wiring patterns extending to the exterior from the beam portion 4 formation area is decreased as compared to the example in FIG. 7.

In the example in FIG. 14A the output of the bridge circuit defined by piezoresistant portions for detecting X-axis direction acceleration fluctuates similar to the first through third preferred embodiments, and the amount of acceleration in the X-axis direction is detected. Also, the output of the bridge circuit defined by piezoresistant portions for detecting Y-axis direction acceleration fluctuates similar to the first through third preferred embodiments, and the amount of acceleration in the Y-axis direction is detected.

Further, acceleration in the Z-axis direction is detected as follows. When acceleration occurs in the Z-axis direction, the weight portions 7 (7a and 7b) are displaced in the Z-axis direction, and the connecting portions 8 and the beam portion 4 are subjected to bending deformation, as described above. Thus, as shown in the model diagram in FIG. 9C, with the beam portion 4, tension stress occurs on both sides $C_U$, $C_D$, $D_U$, $D_D$ of each of the band-shape beam portions on the supporting portion side 16a and 16b. Thus, similar tension stress is imposed on both sides $C_U$, $C_D$, $D_U$, $D_D$ of each of the band-shape beam portions on the supporting portion side 16a and 16b. The piezoresistant portions $R_{Z1}$ and $R_{Z3}$ and the piezoresistant portions $R_{Z2}$ and $R_{Z4}$ have an elongated shape in directions that are substantially perpendicular to each other. In the event of a P-type piezoresistant portion in the [110] direction, if the same stress is imposed on each of the piezoresistant portions having an elongated shape in the direction substantially perpendicular to each other, the electrical resistance value on each piezoresistant portion, having an elongated shape in the direction perpendicular to each other, each vary in the positive/negative direction to each other. With this feature of the piezoresistant portions, when stress caused by acceleration applied in the Z-axis direction occurs on both sides $C_U$, $C_D$, $D_U$, $D_D$ of each of the band-shape beam portion on the supporting portions side 16a and 16b in the beam portion 4 as described above, the electrical resistance value of the piezoresistant portions $R_{Z1}$, $R_{Z3}$ and the piezoresistant portions $R_{Z2}$, $R_{Z4}$ vary in the positive/negative direction to each other. Also, the piezoresistant portions Rz, Rz, Rz', Rz' are arranged on a portion with virtually no stress variances from the acceleration in the Z-axis direction. Thus, when acceleration occurs in the Z-axis direction, the balanced state of the resistance value of the bridge circuit in FIG. 14B loses balance, and the output of the bridge circuit in FIG. 14B varies. The fluctuation width of the output of the bridge circuit in FIG. 14B varies according to the amount of acceleration in the Z-axis direction, and therefore, the amount of acceleration in the Z-axis direction is detected based on the output of the bridge circuit in FIG. 14B.

Now, the amount of bending deformation of the beam portion 4 caused by the acceleration occurring in the Z-axis direction is greater than the amount of bending deformation of the beam portion 4 caused by the acceleration occurring in the Y-axis direction, for example. Also, to suppress the inconsistency of the electrical resistance values of the multiple piezoresistant portions, if all of the piezoresistant portions are formed simultaneously, all of the piezoresistant portions will have approximately the same electrical resistance value. In this case, if the piezoresistant portions are arranged as shown in FIG. 5, and a bridge circuit is formed, for example, as shown in FIGS. 6A through 6C, the output of the bridge circuit in FIG. 6C which originates from acceleration occurring in the Z-axis direction is greater than the output of the bridge circuit in FIG. 6B which originates from acceleration occurring in the Y-axis direction, even if the acceleration amount is the same. In order to improve performance of the acceleration sensor, it is desirable for the output fluctuation width of the bridge circuit with respect to the amount of acceleration to be approximately the same for acceleration in each of the X-axis direction, the Y-axis direction, and the Z-axis direction.

Thus, with the example in FIG. 14A, for the amount of output of the bridge circuits from acceleration occurring in the Z-axis direction to be similar to the amount of output of the bridge circuits from acceleration occurring in the Y-axis direction, piezoresistant portions Rz, Rz, Rz', Rz' for adjusting the electrical resistance value of the bridge circuits are provided in series on each of the piezoresistant portions $R_{Z1}$, $R_{Z2}$, $R_{Z3}$, $R_{Z4}$ for detecting Z-axis direction acceleration. The electrical resistance values of the piezoresistant portions Rz, Rz, Rz', Rz' do not vary even if Z-axis direction acceleration occurs, and thus, the resistance value variance on each side of the bridge circuit when Z-axis direction acceleration occurs is smaller as compared to when only one of the piezoresistant portions $R_{Z1}$, $R_{Z2}$, $R_{Z3}$, $R_{Z4}$ is provided on each side of the bridge circuit. Thus, the output fluctuation width of the bridge circuit with respect to the amount of acceleration in the Z-axis direction can be aligned with the output fluctuation width of the bridge circuit with respect to the amount of acceleration in the X-axis direction or the Y-axis direction.

Further, in the first through third preferred embodiments, the fixed portion 6 has a frame-shape configuration which surrounds the beam portion 4 and weight portions 7 formation area via a gap. However, the fixed portion 6 does not need to have a frame shape, as long as the beam portion 4 can be fixed to the base 2 with the supporting portions 5a and 5b, such as a beam supported at both ends thereof.

Further, in the first through third preferred embodiments, the beam portion 4, the supporting portions 5, the fixed portion 6, the weight portions 7, and the connecting portions 8 are configured with an SOI substrate. However, these do not need to be configured with an SOI substrate.

An acceleration sensor according to various preferred embodiments of the present invention detect acceleration with a high degree of precision in three-axis directions, of the X-axis direction and the Y-axis direction and the Z-axis direction, with one element, and thus, provides a small device which requires a high degree of precision to detect acceleration, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An acceleration sensor, comprising:
    a base having an XY-substrate surface substantially parallel to an XY flat surface and including an X-axis, a Y-axis, and a Z-axis, all of which being perpendicular to one another;
    a beam portion having a frame shape arranged in a floating state above the XY-substrate surface of the base;
    a beam supporting fixed portion arranged to support the beam portion on the base via supporting portions having an elongated shape disposed on both sides of the beam portion, each facing outwards along the X-axis direction;
    a connecting portion having an elongated shape facing outwards along the Y-axis direction from each of two sides of the Y-axis direction of the beam portion in a state of floating above the XY-substrate surface of the base; and
    a weight portion connected to a tip portion of each connection portion; wherein
    the weight portion is arranged to be displaced in each of the X-axis direction, the Y-axis direction, and the Z-axis direction by bending deformation of the frame-shaped beam portion; and
    the beam portion comprises an X-axis direction acceleration detecting portion arranged to detect acceleration in the X-axis direction based on the bending deformation of the beam portion originating in the X-axis direction displacement of the weight portion, a Y-axis direction acceleration detecting portion arranged to detect acceleration in the Y-axis direction based on the bending deformation of the beam portion originating in the Y-axis direction displacement of the weight portion, and a Z-axis direction acceleration detecting portion arranged to detect acceleration in the Z-axis direction based on the bending deformation of the beam portion originating in the Z-axis direction displacement of the weight portion.

2. The acceleration sensor according to claim 1, wherein the center axis of each of the supporting portions is arranged substantially linearly on a common straight line, and the center axis of each of the connecting portions is arranged linearly on the common straight line; and
    the beam portion is arranged symmetrically to an X-direction center line passing through the central axis of the supporting portion and symmetrically to a Y-direction center line which passes through the central axis of the connecting portion.

3. The acceleration sensor according to claim 2, wherein each of the Z-axis direction acceleration detecting portion, the Y-axis direction acceleration detecting portion, and the X-axis direction acceleration detecting portion are defined by a piezoresistant portion in which electrical resistance varies by changes in stress caused by changes in a shape of the beam portion.

4. The acceleration sensor according to claim 3, wherein the X-axis direction acceleration detecting portion includes four piezoresistant portions disposed on the beam portion and arranged on both sides of the connecting portions in a width direction thereof, the piezoresistant portions of the X-axis direction acceleration detecting portion are electrically connected with each other to define two voltage detectors, and the four piezoresistant portions of the X-axis direction acceleration detecting portion define a bridge circuit arranged to detect acceleration in the X-axis direction based on voltage differences output from each of the two voltage detectors when the beam portion changes shape due to acceleration in the X-axis direction;
    the Y-axis direction acceleration detecting portion includes four piezoresistant portions disposed on the beam portion arranged on both sides of the supporting portions in a width direction thereof, the piezoresistant portions of the Y-axis direction acceleration detecting portion are electrically connected with each other to define two voltage detectors, and the four piezoresistant portions of the Y-axis direction acceleration detecting portion define a bridge circuit arranged to detect acceleration in the Y-axis direction based on a voltage difference output from each of the two voltage detectors when the beam portion changes shape due to acceleration in the Y-axis direction; and the Z-axis direction acceleration detecting portion includes four piezoresistant portions disposed on the beam portion, two of the piezoresistant portions of the Z-axis direction acceleration detecting portion are disposed on portions of the beam portion in which stress does not change when acceleration occurs, and the other two piezoresistant portions of the Z-axis direction acceleration detecting portion are arranged on one side of the beam portion on the supporting portion side, such that two voltage detectors are defined by electrically connecting piezoresistant portions which are arranged in close proximity to each other, and the four piezoresistant portions of the Z-axis direction acceleration detecting portion define a bridge circuit arranged to detect acceleration in the Z-axis direction based on a voltage difference output from each of the two voltage detectors when the beam portion changes shape due to acceleration in the Z-axis direction.

5. The acceleration sensor according to claim 4, wherein the frame-shaped beam portion has a substantially consistent thickness throughout the entire frame in the Z-axis direction.

6. The acceleration sensor according to claim 4, wherein a thickness in the Z-axis direction of the beam portion in the vicinity of the supporting portion and in the vicinity of the connecting portion is greater than a thickness of other portions of the beam portion.

7. The acceleration sensor according to claim 3, wherein the frame-shaped beam portion has a substantially consistent thickness throughout the entire frame in the Z-axis direction.

8. The acceleration sensor according to claim 3, wherein a thickness in the Z-axis direction of the beam portion in the vicinity of the supporting portion and in the vicinity of the connecting portion is greater than a thickness of other portions of the beam portion.

9. The acceleration sensor according to claim 3, wherein
the X-axis direction acceleration detecting portion includes a total of four piezoresistant portions disposed on the beam portion and arranged on both sides of the connecting portion side, the piezoresistant portions of the X-axis direction acceleration detecting portion are electrically connected with each other to define two voltage detectors, and the four piezoresistant portions of the X-axis direction acceleration detecting portion define a bridge circuit arranged to detect acceleration in the X-axis direction based on the voltage difference output from each of the two voltage detectors when the beam portion changes shape due to acceleration in the X-axis direction;

the Y-axis direction acceleration detecting portion includes four piezoresistant portions disposed on the beam portion and arranged on both sides of the supporting portion, and the piezoresistant portions of the Y-axis direction acceleration detecting portion are electrically connected with each other to define two voltage detectors, and the four piezoresistant portions of the Y-axis direction acceleration detecting portion define a bridge circuit arranged to detect acceleration in the Y-axis direction based on the voltage difference output from each of the two voltage detectors when the beam portion changes shape due to acceleration in the Y-axis direction; and the Z-axis direction acceleration detecting portion includes four piezoresistant portions disposed on the beam portion and arranged each on both sides of the supporting portion, and two voltage detectors are defined by electrically connecting the piezoresistant portions of the Z-axis direction acceleration detecting portion which are arranged on both sides of the supporting portion, and the four piezoresistant portions of the Z-axis direction acceleration detecting portion define a bridge circuit arranged to detect acceleration in the Z-axis direction based on the voltage difference output from each of the two voltage detectors when the beam portion changes shape due to acceleration in the Z-axis direction.

10. The acceleration sensor according to claim 2, wherein the frame-shaped beam portion has a substantially consistent thickness throughout the entire frame in the Z-axis direction.

11. The acceleration sensor according to claim 2, wherein a thickness in the Z-axis direction of the beam portion in the vicinity of the supporting portion and in the vicinity of the connecting portion is greater than a thickness of other portions of the beam portion.

12. The acceleration sensor according to claim 1, wherein each of the Z-axis direction acceleration detecting portion, the Y-axis direction acceleration detecting portion, and the X-axis direction acceleration detecting portion are defined by a piezoresistant portion in which electrical resistance varies by changes in stress caused by changes in a shape of the beam portion.

13. The acceleration sensor according to claim 12, wherein the X-axis direction acceleration detecting portion includes four piezoresistant portions disposed on the beam portion and arranged on both sides of the connecting portions in a width direction thereof, the piezoresistant portions of the X-axis direction acceleration detecting portion are electrically connected with each other to define two voltage detectors, and the four piezoresistant portions of the X-axis direction acceleration detecting portion define a bridge circuit arranged to detect acceleration in the X-axis direction based on voltage differences output from each of the two voltage detectors when the beam portion changes shape due to acceleration in the X-axis direction;

the Y-axis direction acceleration detecting portion includes four piezoresistant portions disposed on the beam portion arranged on both sides of the supporting portions in a width direction thereof, the piezoresistant portions of the Y-axis direction acceleration detecting portion are electrically connected with each other to define two voltage detectors, and the four piezoresistant portions of the Y-axis direction acceleration detecting portion define a bridge circuit arranged to detect acceleration in the Y-axis direction based on a voltage difference output from each of the two voltage detectors when the beam portion changes shape due to acceleration in the Y-axis direction; and the Z-axis direction acceleration detecting portion includes four piezoresistant portions disposed on the beam portion, two of the piezoresistant portions of the Z-axis direction acceleration detecting portion are disposed on portions of the beam portion in which stress does not change when acceleration occurs, and the other two piezoresistant portions of the Z-axis direction acceleration detecting portion are arranged on one side of the beam portion on the supporting portion side, such that two voltage detectors are defined by electrically connecting piezoresistant portions which are arranged in close proximity to each other, and the four piezoresistant portions of the Z-axis direction acceleration detecting portion define a bridge circuit arranged to detect acceleration in the Z-axis direction based on a voltage difference output from each of the two voltage detectors when the beam portion changes shape due to acceleration in the Z-axis direction.

14. The acceleration sensor according to claim 13, wherein the frame-shaped beam portion has a substantially consistent thickness throughout the entire frame in the Z-axis direction.

15. The acceleration sensor according to claim 13, wherein a thickness in the Z-axis direction of the beam portion in the vicinity of the supporting portion and in the vicinity of the connecting portion is greater than a thickness of other portions of the beam portion.

16. The acceleration sensor according to claim 12, wherein the frame-shaped beam portion has a substantially consistent thickness throughout the entire frame in the Z-axis direction.

17. The acceleration sensor according to claim 12, wherein a thickness in the Z-axis direction of the beam portion in the vicinity of the supporting portion and in the vicinity of the connecting portion is greater than a thickness of other portions of the beam portion.

18. The acceleration sensor according to claim 12, wherein
the X-axis direction acceleration detecting portion includes a total of four piezoresistant portions disposed on the beam portion and arranged on both sides of the connecting portion side, the piezoresistant portions of the X-axis direction acceleration detecting portion are electrically connected with each other to define two voltage detectors, and the four piezoresistant portions of the X-axis direction acceleration detecting portion define a bridge circuit arranged to detect acceleration in the X-axis direction based on the voltage difference output from each of the two voltage detectors when the beam portion changes shape due to acceleration in the X-axis direction;
the Y-axis direction acceleration detecting portion includes four piezoresistant portions disposed on the beam portion and arranged on both sides of the supporting portion, and the piezoresistant portions of the Y-axis direction acceleration detecting portion are electrically connected with each other to define two voltage detectors, and the four piezoresistant portions of the Y-axis direction acceleration detecting portion define a bridge circuit arranged to detect acceleration in the Y-axis direction based on the voltage difference output from each of the two voltage detectors when the beam portion changes shape due to acceleration in the Y-axis direction; and
the Z-axis direction acceleration detecting portion includes four piezoresistant portions disposed on the beam portion and arranged each on both sides of the supporting portion, and two voltage detectors are defined by electrically connecting the piezoresistant portions of the Z-axis direction acceleration detecting portion which are arranged on both sides of the supporting portion, and the four piezoresistant portions of the Z-axis direction acceleration detecting portion define a bridge circuit arranged to detect acceleration in the Z-axis direction based on the voltage difference output from each of the two voltage detectors when the beam portion changes shape due to acceleration in the Z-axis direction.

19. The acceleration sensor according to claim 1, wherein the frame-shaped beam portion has a substantially consistent thickness throughout the entire frame in the Z-axis direction.

20. The acceleration sensor according to claim 1, wherein a thickness in the Z-axis direction of the beam portion in the vicinity of the supporting portion and in the vicinity of the connecting portion is greater than a thickness of other portions of the beam portion.

21. The acceleration sensor according to claim 1, wherein a reinforcing portion is arranged in a space inside the frame of the frame-shaped beam portion, which links the supporting portions on both sides of the beam portion, and both ends of the reinforcing portion are each connected to the frame-shaped beam portion.

22. The acceleration sensor according to claim 21, wherein the supporting portion is connected to a beam-supporting fixed portion via an elastic portion, the elastic portion elastically changing shape corresponding to distortions of the beam-supporting fixed portion and decreasing stresses which originate from the distortion of the beam-supporting fixed portion and which are applied to the supporting portion from the beam-supporting fixed portion.

23. The acceleration sensor according to claim 22, wherein the elastic portion includes a beam which is elongated so as to intersect with a supporting portion elongation direction, both ends of the beam of the elastic portion being fixed to the beam-supporting fixed portion, and the supporting portion being connected to the beam of the elastic portion and supported by the beam-supporting fixed portion.

24. The acceleration sensor according to claim 1, wherein the supporting portion is connected to a beam-supporting fixed portion via an elastic portion, the elastic portion elastically changing shape corresponding to distortions of the beam-supporting fixed portion and decreasing stresses which originate from the distortion of the beam-supporting fixed portion and which are applied to the supporting portion from the beam-supporting fixed portion.

25. The acceleration sensor according to claim 24, wherein the elastic portion includes a beam which is elongated so as to intersect with a supporting portion elongation direction, both ends of the beam of the elastic portion being fixed to the beam-supporting fixed portion, and the supporting portion being connected to the beam of the elastic portion and supported by the beam-supporting fixed portion.

* * * * *